(12) United States Patent
Richardson et al.

(10) Patent No.: US 7,596,275 B1
(45) Date of Patent: Sep. 29, 2009

(54) METHODS AND SYSTEMS FOR IMAGING AND CLASSIFYING TARGETS AS EMPTY OR NON-EMPTY

(75) Inventors: Rex D. Richardson, Poway, CA (US); Ernest E. Muenchau, San Diego, CA (US); James Henry Winso, Escondido, CA (US); Jaroslaw W. Tuszynski, Fairfax, VA (US); Weicheng Shen, Vienna, VA (US)

(73) Assignee: Science Applications International Corporation, San Diego, CA (US)

( * ) Notice: Subject to any disclaimer, the term of this patent is extended or adjusted under 35 U.S.C. 154(b) by 883 days.

(21) Appl. No.: 11/067,925

(22) Filed: Mar. 1, 2005

Related U.S. Application Data

(60) Provisional application No. 60/548,161, filed on Mar. 1, 2004.

(51) Int. Cl.
*G06K 9/62* (2006.01)
*G01N 23/04* (2006.01)
*G01F 23/00* (2006.01)

(52) U.S. Cl. .................. 382/224; 378/57; 250/358.1

(58) Field of Classification Search ......... 382/128–132, 382/224; 278/58.1; 250/358.1
See application file for complete search history.

(56) References Cited

U.S. PATENT DOCUMENTS

| | | | | |
|---|---|---|---|---|
| 4,951,201 | A * | 8/1990 | Takeo et al. | 382/128 |
| 5,797,396 | A * | 8/1998 | Geiser et al. | 600/407 |
| 5,838,759 | A * | 11/1998 | Armistead | 378/57 |
| 6,255,654 | B1 | 7/2001 | Verbinski et al. | 250/358.1 |
| 6,507,025 | B1 | 1/2003 | Verbinski et al. | 250/358.1 |
| 6,552,346 | B2 | 4/2003 | Verbinski et al. | 250/358.1 |
| 7,045,787 | B1 * | 5/2006 | Verbinski et al. | 250/358.1 |
| 2003/0174221 | A1 * | 9/2003 | Tsuda | 348/241 |

OTHER PUBLICATIONS

White Paper, "Automated, High-Speed Non-Intrusive Inspection of Empty Cargo Containers," 5 pp., Jul. 5, 2002.

* cited by examiner

*Primary Examiner*—Bhavesh M Mehta
*Assistant Examiner*—Hadi Akhavannik
(74) *Attorney, Agent, or Firm*—King & Spalding LLP

(57) ABSTRACT

The present invention relates to systems and methods for characterizing targets, e.g., trucks, pallets, trains, cars, and the like, using digital target imaging. Accordingly, embodiments of the present invention provide, at base: a) image segmentation and filtering to identify surrounding white space, interior walls, floor, and ceiling of the container; morphology routines to identify and classify objects found inside the container; and decision routines to report status of container as empty or non-empty with a confidence factor from 1-100.

27 Claims, 15 Drawing Sheets
(9 of 15 Drawing Sheet(s) Filed in Color)

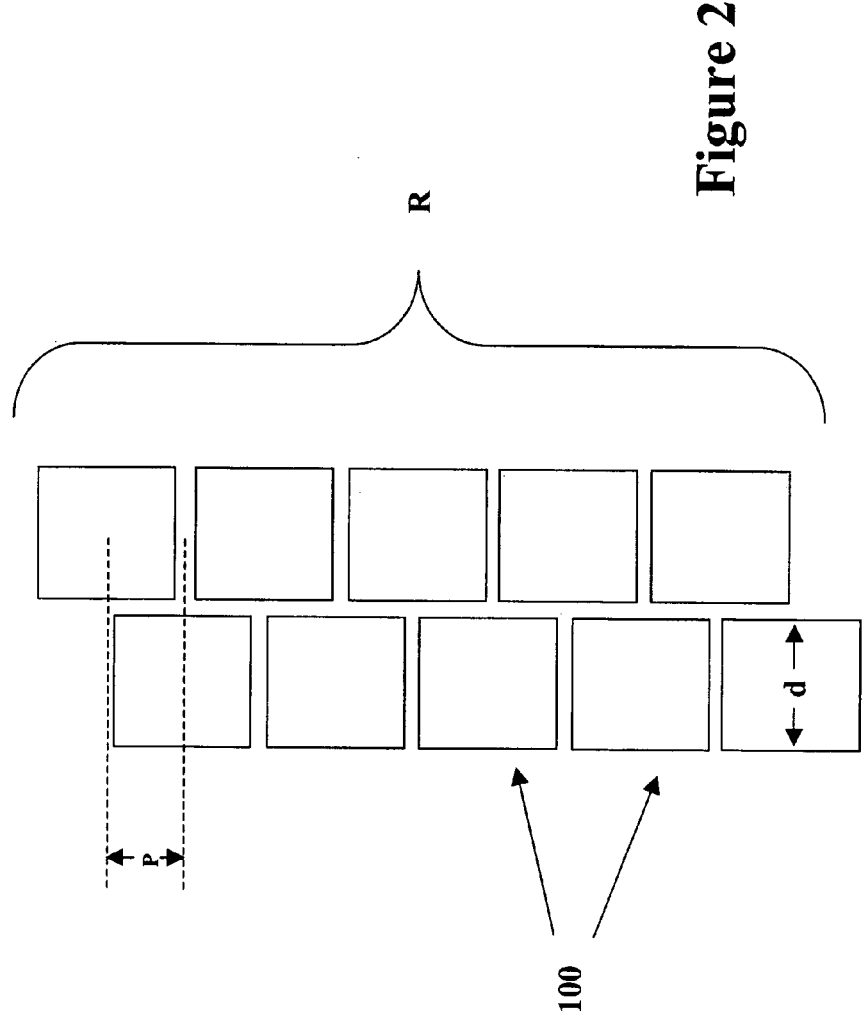

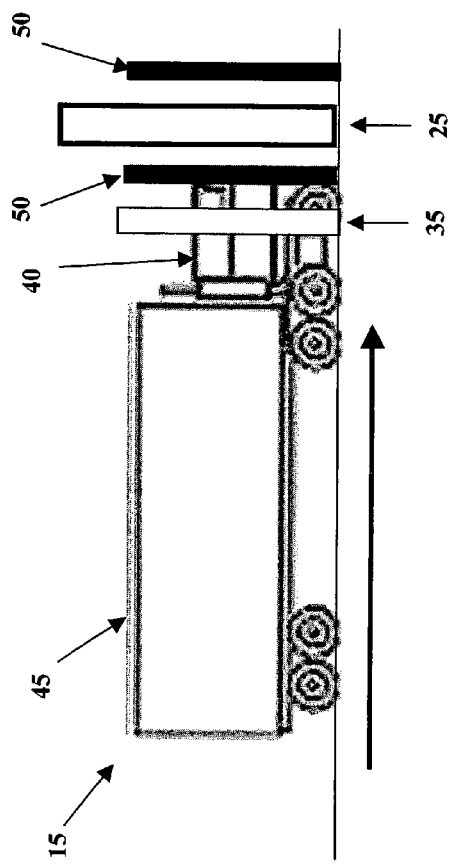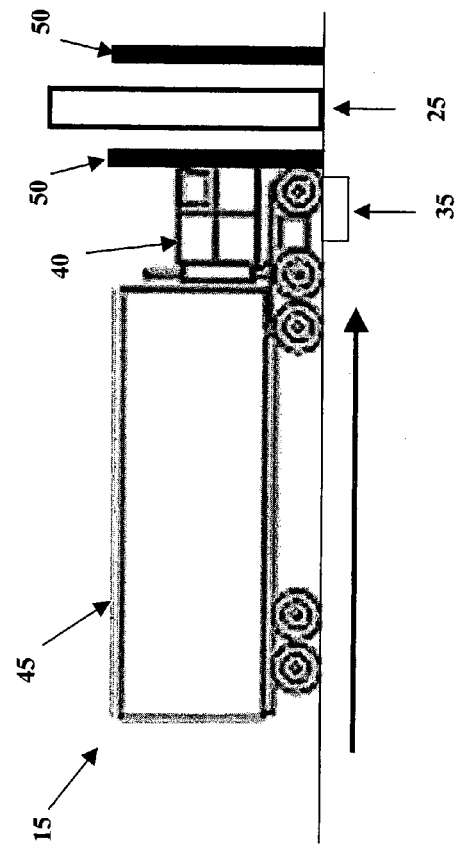

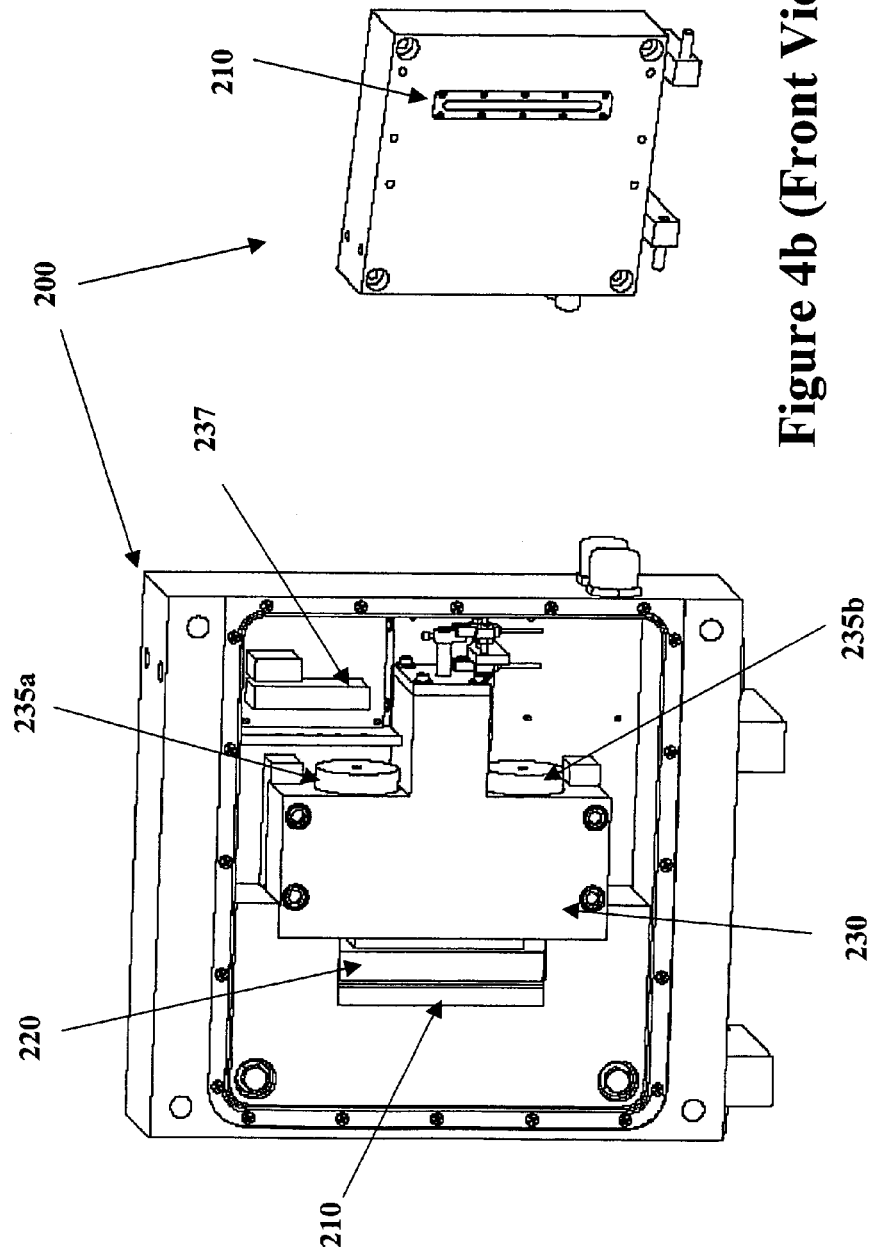
Figure 4a (Back View)
Figure 4b (Front View)

METHODS AND SYSTEMS FOR IMAGING AND CLASSIFYING TARGETS AS EMPTY OR NON-EMPTY

PRIORITY INFORMATION

This application claims priority to U.S. Provisional Patent Application No. 60/548,161, filed Mar. 1, 2004, entitled, "METHOD AND SYSTEM FOR IMAGING AND CLASSIFYING TARGETS AS EMPTY OR NON-EMPTY," which is incorporated herein by reference in its entirety.

CROSS-REFERENCE TO RELATED PATENTS AND APPLICATIONS

This application is related to the following U.S. Patent:
U.S. Pat. No. 6,507,025, entitled, "DENSITY DETECTION USING REAL TIME DISCRETE PHOTON COUNTING FOR FAST MOVING TARGETS," issued Jan. 14, 2003.

The aforementioned U.S. Patent is incorporated herein by reference in its entirety.

This application is also related to the following pending U.S. Patent Applications:
U.S. patent application Ser. No. 09/925,009, entitled, "DENSITY DETECTION USING REAL TIME DISCRETE PHOTON COUNTING FOR FAST MOVING TARGETS," filed Aug. 9, 2001;
U.S. patent application Ser. No. 10/717,632, entitled, "SYSTEM AND METHOD FOR TARGET INSPECTION USING DISCRETE PHOTON COUNTING AND NEUTRON DETECTION," filed Nov. 21, 2003;
U.S. patent application Ser. No. 10/767,723 entitled, "METHOD AND SYSTEM FOR AUTOMATICALLY SCANNING AND IMAGING THE CONTENTS OF A MOVING TARGET," filed Jan. 30, 2004;
U.S. patent application Ser. No. 10/833,131, entitled, "DENSITY DETECTION USING REAL TIME DISCRETE PHOTON COUNTING FOR FAST MOVING TARGETS," filed Apr. 28, 2004; and
U.S. patent application Ser. No. 10/856,942 entitled TARGET DENSITY IMAGING USING DISCRETE PHOTON COUNTING TO PRODUCE HIGH-RESOLUTION RADIOGRAPHIC IMAGES, filed Jun. 1, 2004.

Each of the aforementioned patent applications is also incorporated herein by reference in its entirety.

BACKGROUND OF THE INVENTION

1. Field of the Invention

The present invention relates generally to the imaging of targets, e.g., trucks, pallets, trains, cars and the like. More particularly, the invention is directed to methods and systems for characterizing a target's cargo holding as empty or non-empty using imaging.

2. Background

There are many instances in the security or customs field when it is necessary to examine or inspect, in a non-destructive way, the contents of a target object, such as a closed package, box, suitcase, cargo container, automobile semi-trailer, tanker truck, railroad car, e.g., box car or tanker car, or the like. In other instances, it may be necessary to verify, in a non-destructive way, that the target object is empty as declared by the shipper and insure that there are no hidden compartments. For example, customs departments are routinely charged with the responsibility of inspecting vehicles coming into a country to make sure such vehicles do not contain drugs or other contraband, or leaving the country with stolen automobiles, drug money, and other illicit contraband. Similarly, drug smugglers frequently carry out their criminal acts by hiding illegal drugs in vehicles such as tanker trucks, and then sending the trucks through a border checkpoint. When security personnel encounter suspicious vehicles or other containers being transported over international boundaries, they must perform a careful time consuming (~½ hour) inspection of such vehicles to ascertain their contents and/or verify that they are empty. Similarly, when suspicious trucks or cars enter compounds overseas having U.S. troops or containing embassy offices, they must be inspected for hidden vehicle bombs, poisonous gases, etc., even though they may have been declared as empty.

When suspicious vehicles are discovered, they generally must be examined or inspected on location in what is referred to as a "secondary inspection area." If secondary inspection reveals the presence of contraband (e.g., drugs), then the vehicle may be impounded, the driver arrested, and the contraband disposed of. If, on the other hand, the examination reveals the absence of contraband or confirms that the vehicle is empty, then the vehicle may be allowed to proceed in the normal manner.

SUMMARY OF THE INVENTION

Summary of the Problems

The process used to examine or inspect a suspicious vehicle should be quick, simple, as non-intrusive as possible and fast enough so as to not impede the "flow of commerce" or other traffic. Unfortunately, most common conventional inspection mechanisms require either visual inspection by others and/or scent inspection by dogs. These conventional inspection methods require that the vehicle stop and wait for the inspection to be completed, which can take a half-hour or more. This is both inconvenient and time consuming for both customs officials and the vehicle drivers and occupants, and severely limits the number of vehicles, particularly those that are declared or indicated as empty by the shippers, that can be inspected each day. What is needed, therefore, is a rapid, non-invasive technique for inspecting the interior of a suspicious vehicle and verifying that it is empty or not empty without requiring that the vehicle be stopped and manually inspected.

A further problem posed by manual inspection techniques arises when tanker trucks or railroad cars, after having been emptied, seek to cross a border in order to refill. Because some such tankers (e.g., liquefied petroleum gas tankers that are of thick, double-walled steel construction) cannot be completely emptied without releasing the pressure in such tankers and venting noxious (and explosive) gasses into the atmosphere, the tankers typically are kept nominally under pressure. (The venting of noxious gasses would be hazardous and ecologically unacceptable.) Thus, the contents or lack thereof of such tankers typically go uninspected or without verification by customs agents in order to avoid the time-consuming (up to 3 days, with nitrogen purging) venting of such gases. Unfortunately, drug smugglers are well aware of this fact, and therefore utilize tanker trucks and railroad cars to import illegal drugs, knowing that they will not be inspected at the border. This venting condition provides just one of numerous additional examples of cases where invasive or intrusive inspection into vehicles, or other containers, is not feasible or desirable. Thus, this venting condition further emphasizes the need for a non-intrusive approach to vehicle inspection, especially by a high-energy gamma-ray radiographic system that easily penetrates the steel walled tanker and verifies that it is empty.

Yet a further problem with prior vehicle inspection systems is that some, employing complex x-ray inspection sources, move a vehicle past a source and detector, which constitute heavy equipment subject to frequent breakdowns, and requiring very high capital costs for installation. Some inspect at a rate as low as 10-15 minutes per cargo vehicle, according to U.S. Customs Inspectors.

Additionally, some prior systems employing a high intensity standard x-ray radiation source require, at the beginning of the day, from one-half hour to 1 hour to warm up, depending upon the intervals between use. The x-ray source is expensive to buy and to install and requires an appreciable amount of power to operate, is sensitive to ambient humidity and motion-shock and is expensive and time-consuming to repair. Furthermore, these expensive x-ray sources frequently require a permanent shielding structure, which, along with the vehicle-moving mechanism, further boosts the capital costs. Some prior x-ray based systems also require precise speed control of the scanning process and are limited to scan speeds less than 30 cm/s. These speed limitations are not compatible with a high throughput inspection operation.

Therefore, there exists a need in the industry of cargo-vehicle inspection systems for a vehicle inspection system capable of providing a non-impeding, swift inspection of empty packages or containers on fast-moving vehicles so as not to hold up vehicle-traffic at border inspection points.

Summary of the Solutions

The present invention advantageously addresses at least the above needs and other needs by building upon the discrete photon counting approach described in the above-referenced U.S. Patents and Patent Applications to inspect packages or containers indicated by the shipper to be empty and to insure that they are indeed empty and do not include any hidden compartments and contraband.

Accordingly, in one embodiment of the present invention, there is provided a process for determining the cargo status of a container as empty or non-empty. The process includes segmenting an image of the container into multiple segments, the multiple segments represent images of ends of the container, a roof of the container, a floor of the container and air within the container. The process further includes: determining the presence, if any, of objects within each of the multiple segments of the image; calculating data representing the density, shape and position of each of the objects, if any, within each of the multiple segments of the image; and pooling the data for each of the objects, if any, from each of the multiple segments of the image; and, finally, reporting the cargo status of the container as empty or non-empty based on the data for each of the objects, if any, with a confidence factor in the range of 1-100, with 1 being the least confident and 100 being the most confident.

In another embodiment of the present invention, there is provided a process for determining the cargo status of a target as empty or non-empty. The process includes converting an image pixel value for each pixel comprising an image of the target to an intensity percentage within the range of 0-100%. Next, identifying an inner container of the target including front and back walls, ceiling and floor thereof, i.e., determining a boundary of the container to identify the inner container, utilizing the intensity percentages for each pixel comprising the image of the target; dividing at least one row of pixels above the identified floor of the target into N segments; calculating the average intensity for the N segments; and comparing an individual intensity for each of the N segments to a predetermined threshold θ. And, finally, reporting a non-empty cargo status of the target if any of the N segment's intensities is less than θ.

BRIEF DESCRIPTION OF THE DRAWINGS

The patent or application file contains at least one drawing executed in color. Copies of this patent or patent publication with color drawings(s) will be provided by the Office upon request and payment of the necessary fee.

The preferred embodiments are illustrated by way of example and not limited in the following figure(s), in which:

FIG. 2 depicts a detector configuration according to an embodiment of the present invention;

FIG. 3a depicts a non-stop automatic scan system with a first stop/start sensor configuration according to an embodiment of the present invention;

FIG. 3b depicts a non-stop automatic scan system with a second stop/start sensor configuration according to an embodiment of the present invention;

FIG. 4a depicts a first view of a shutter mechanism according to an embodiment of the present invention;

FIG. 4b depicts a second view of a shutter mechanism according to an embodiment of the present invention;

DETAILED DESCRIPTION OF THE INVENTION

In addition to the description set forth explicitly below, numerous details and descriptions for various aspects of the preferred embodiments are set forth in the aforementioned U.S. Patents and Patent Applications that are herein incorporated by reference in their entireties.

Reference is now made in detail to embodiments of the present invention, some examples of which are illustrated in the accompanying drawings, in which like numerals indicate like elements, showing methods and systems for target density imaging using discrete photon counting to inspect and classify targets as empty or non-empty with a confidence factor between 1-100.

Figure 1A:
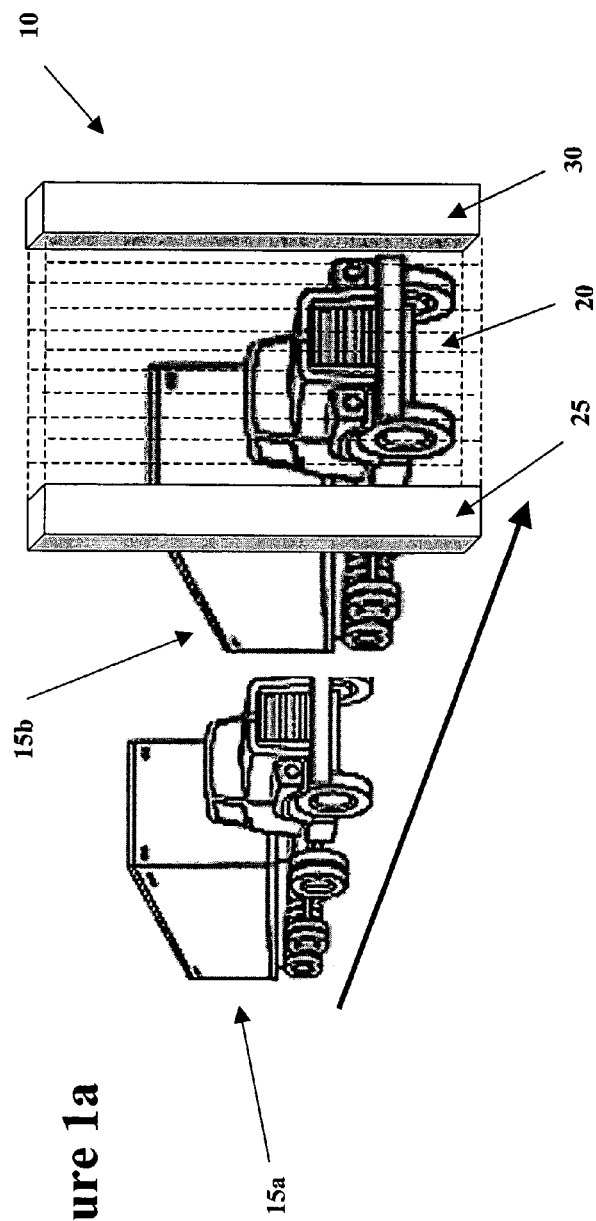
FIG. 1a depicts a first view of a non-stop automatic scan system according to an embodiment of the present invention.
Figure 1B:
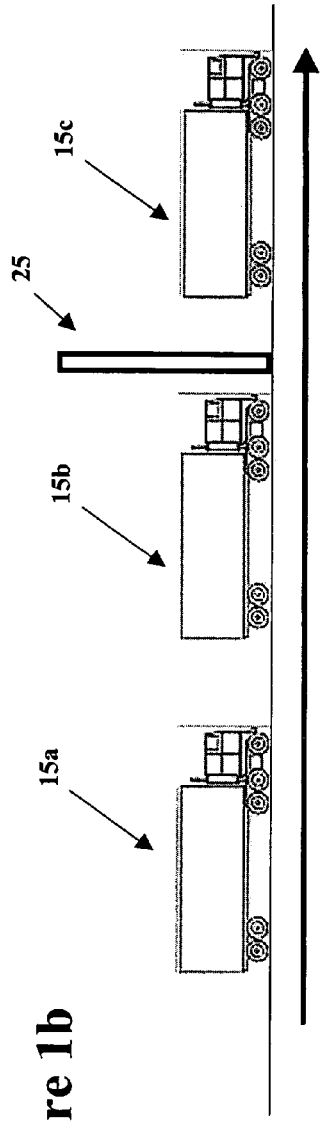
FIG. 1b depicts a second view of a non-stop automatic scan system according to an embodiment of the present invention.

Referring to FIGS. 1a and 1b, a preferred embodiment of the present invention provides a non-stop drive-through scanning system 10 for imaging the contents of moving target vehicles, e.g., 15a, 15b, 15c, etc. (referred to herein individually as 15). The preferred embodiments of the present invention facilitate back-to-back scanning of moving vehicles 15a, 15b, 15c, etc., without the need to stop each vehicle and initiate scanning manually, thus facilitating increased rate of the flow of commerce. The system of FIGS. 1a and 1b allows the driver of a vehicle, e.g., van, truck, train, etc. to enter the scanning zone or lane 20 without the need to stop or exit from the target vehicle 15. A system of sensors determines opening and closing times of the gamma ray source to prevent exposing the driver or occupants of the cab to the scan beam. In one tested embodiment the sensors detect the air gap between the cab and the cargo box or container in a tractor-trailer rig. Other sensors can be deployed to allow scanning of other types of vehicles. The scanning lane 20 is defined by the space between opposing source/detector towers 25, 30. The scanning system 10 is sufficiently flexible to enable installation in variable lane widths (e.g., from 13-18 ft), and each installation can be independent of and will not impede adjacent lanes. Details regarding various embodiments of the source/detector towers 25, 30 are described in the patents and applications listed above which are incorporated herein by reference.

Figure 1C:
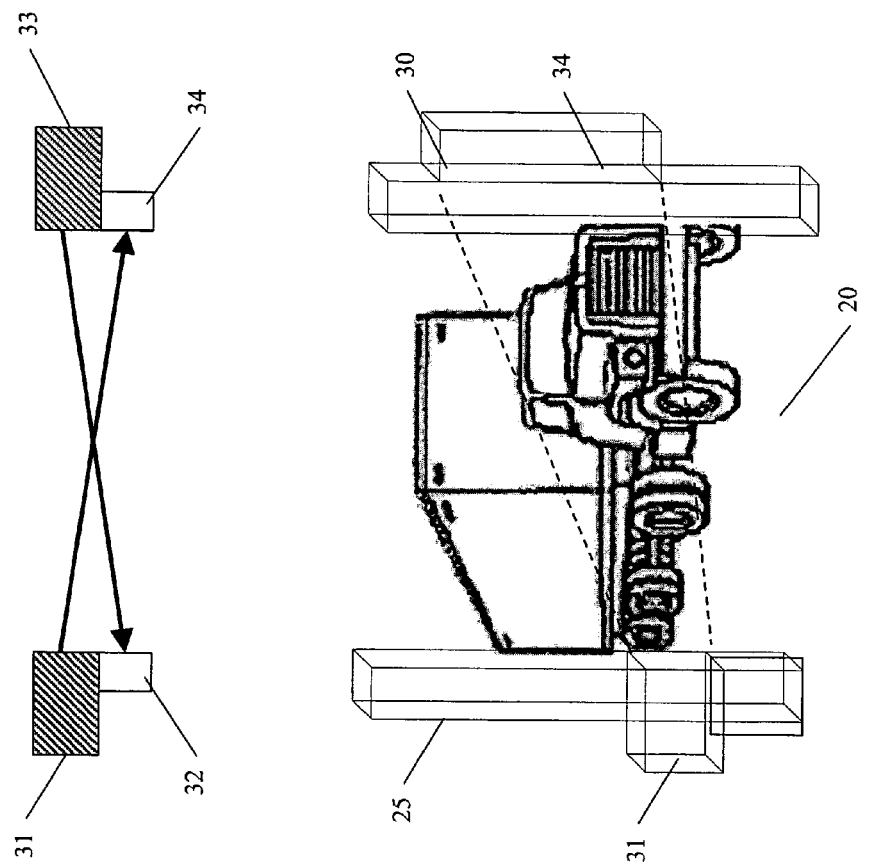
FIGS. 1c and 1d depict a source-and-detector geometry in accordance with an embodiment of the present invention.
Figure 1D:
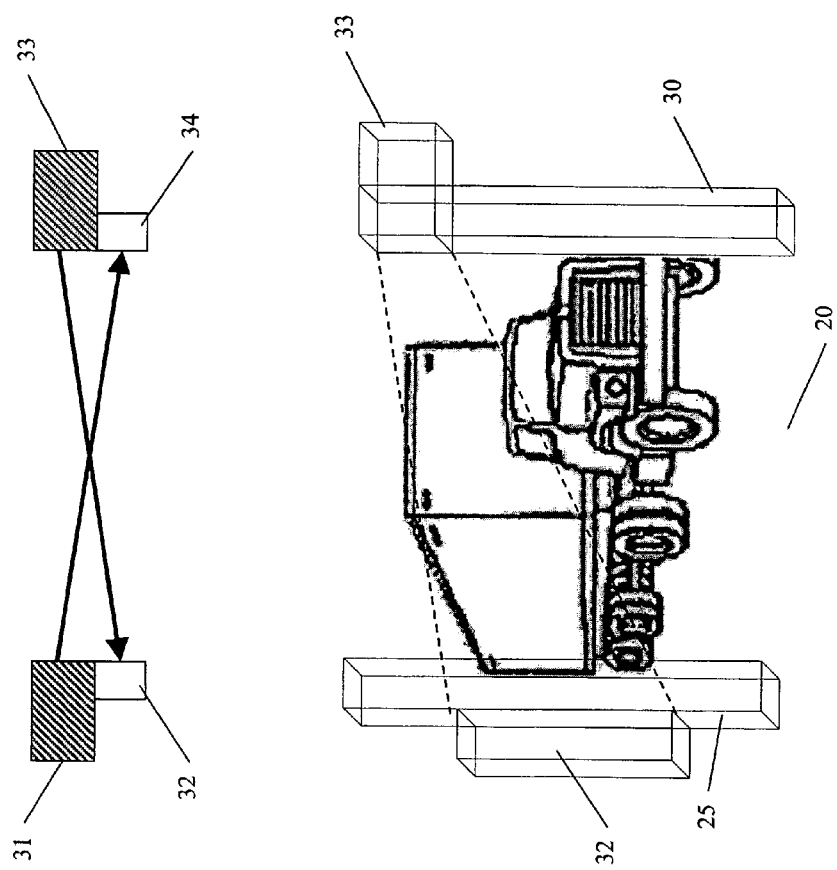

According to one embodiment of the present invention, the scanning system 10 includes two radiation sources 31, 33 and two detector arrays 32, 34 arranged in a source-and-detector geometry as shown in FIGS. 1c and 1d. In FIG. 1c, on the "low-source" side, i.e., tower 25, the source 31 is at the bottom and illuminates upward to the detector 34 on the bottom of the driver side tower, i.e., tower 30. The image derived from the detector array 34, hereinafter referred to as the "lower" image, provides full coverage to the bottom of the vehicle container. Conversely, in FIG. 1d, on the "high source" side, i.e., tower 30, the source 33 is at the top and illuminates downward to the passenger side detector array 32 on the low-source side tower, i.e., tower 25. The image derived from the detector array 32, hereinafter referred to as the "upper" image, provides full coverage of the top of the vehicle container. In this geometry, the two sources 31, 33 are mounted on the towers 25, 30, with one source on each side of the scanning lane 20, to image the container from the top and from the bottom, encompassing 100% of the container in one pass. FIGS. 1c and 1d depict the low-source side, i.e., tower 25, as being located on the passenger side and the high-source side, i.e., tower 30, as being located on the driver side. However, it should be understood that in an alternative embodiment, the low-source side, i.e., tower 25, can be located on the driver side and the high-source side, i.e., tower 30, can be located on the passenger side without deviating from the scope of the present invention. Furthermore, another alternate embodiment is achieved by operating only with the low side source which covers the bottom part of the vehicle or cargo area. This arrangement is useful for commercial applications wherein it is assumed that cargo, dunnage, or waste materials are resting on the container floor. Furthermore an alternate geometry could consist of a single source and a 100% coverage detector array.

As disclosed in the patents and applications listed above, which are incorporated herein by reference, and by way of example, each of the sources 31, 33 may include a radiation source such as a $3.7 \times 10^{10}$ Bq (i.e., 1 Curie) shuttered source of Cs-137 gamma-rays, i.e., 662 keV gamma-ray energy. In still another embodiment, a Co-60 source may be used. A suitable source is readily available as Model Nos. SH-F-2 and SH-F-3 from Ohmart Corporation of Ohio. The radiation source may include a collimator that provides desired vertical and lateral opening specifications. Because extreme penetration is not required, the source strength can be lowered to approximately 0.75-1.0 Curies to minimize the radiation exposure requirements and enable multiple lane capabilities. As also disclosed in the incorporated patents and applications listed above, for higher speed applications, a stronger source strength corresponding to a respective speed can be used for the radiation source. Further, there may be included a restricted zone within each scanning lane 20 for protecting drivers from radiation overdose.

The radiation sources 31, 33 provide gamma-rays that are only moderately attenuated by steel walls typically found in tanker trucks or railroad cars. Yet such rays are sufficiently attenuated by contraband packages to make them easily detectable by measuring the penetration of the gamma-rays emitted from the source and deriving relative material densities therefrom. In addition, there is negligible radiation exposure due to scattering of the gamma-ray energy from the tanker walls or cargo, much less than would occur if a high powered x-ray source was utilized.

Each of the detector arrays 32, 34 employs a plurality of high efficiency gamma-ray detectors, e.g., between 48 and 384, e.g., forty-eight, detectors arranged in a vertical column. The detectors make it possible to scan the target vehicle with a very low intensity gamma-ray field. In order to facilitate the use of very low intensity gamma-radiation, high efficiency detectors are used, such as are available as Part No. 1.5M1.5M1.5, NaI (TI) (sodium iodide crystal, thallium activated) (with R2060 photomultiplier tube) from BICRON of Ohio. Such gamma-ray detectors are scintillation counter-type detectors and are 3.8 cm in diameter, 3.8 cm high and mounted on a 3.8 cm photo-multiplier tube (PMT).

Alternatively, 1.125" (2.858 cm) square detectors may be used with the number of detectors used in the detector configuration ranging between 48 and 384, e.g., nominally 80, depending on desired resolution requirements. Referring to FIG. 2, in one embodiment, the detector array includes a plurality of staggered NaI/PMT square photon detector elements 100. Each individual detector is 1.125" (2.858 cm) square and has a pitch P smaller than the side (d) of the staggered detector elements 100. Two (2) vertical rows R of staggered detector elements 100 are employed, instead of a single row of detectors. The two (2) vertical rows R are vertically staggered from each other. The pitch P between two (2) closest adjacent such staggered detector elements 100 may preferably be about 0.75", when employing staggered detector elements 100 having a 1.125" (2.858 cm) side, thereby yielding a count rate of about 95,000 counts/second for each staggered detector element for D=16 feet and for a 1.0 Curie Cs-137 source. By way of example, this pitch P results in a vertical image resolution, $R_{vert}$ of about 0.375" when the radiation source is a distance D of 16 feet from the staggered detector element and the radiation source is a distance Z of 8 feet (2.4 meters) from a center of the moving target vehicle wherein $R_{vert}=PZ/D$.

The staggered detectors are staggered from each other in a vertical direction, yet their surfaces of each vertical row all lie in a same plane, thereby avoiding shadowing from any other staggered detector while enabling a smaller pitch P.

It should be understood that aside from the gamma-ray detectors described above, other presently-known or potentially-available gamma ray detectors with different dimensions and/or detector column arrangements can be used in accordance with the disclosure of and be within the scope of the invention.

Referring to FIGS. 3a and 3b, at least one start/stop sensor 35 is located prior to the scanning zone and is used to determine when the cab or driver/passenger area 40 (hereafter "cab") has cleared the scanning zone and the payload 45 of the target vehicle 15 is entering the scanning zone. Once the start/stop sensor 35 senses the payload 45 has entered, or is about to enter, the scanning zone, the non-stop system initiates an automatic scan. The start/stop sensor 35 may include at least one of optical, electrical, pressure, video technology or the like for determining the start/stop points and automatic scan initiations as described above. More particularly, and by way of example, sensor technologies may be employed to count axles and/or measure the space between the cab 40 and the payload 45. In FIG. 3a, the at least one start/stop sensor 35 is located prior to the scanning zone 20 and is above the level of the driving surface. In an alternative embodiment shown in FIG. 3b, the start/stop sensor 35 is located within or very near to the driving surface. In this embodiment, the sensor maybe outside of the driving lane or actually in the driving lane such that the target vehicle is driven directly over the start/stop sensor 35. It should be understood from the present disclosure by one skilled in the art that various other sensor configurations can be used within the scope of the present invention.

Referring to FIGS. 4a-4b, in an embodiment of the present invention the automatic initiation of a scan includes, among other features, controlling a shutter assembly, including a fast shutter mechanism 200 located in the source tower that allows at least a first fast shutter to open and allow radiation from the radiation source to exit through beam aperture 210 in a sufficient time, e.g., on the order of a few tens of milliseconds, between detection of the cab and the payload by the start/stop sensor, so as to allow for a complete payload scan, i.e., including the beginning edge of the payload, while the target vehicle is moving, i.e., at speeds of up to 10 miles per hour, with normal operating range of between 5-10 mph. By way of particular example, the system and method of the present invention facilitates a fast shutter opening time on the order of 50 milliseconds or less, preferably 40 milliseconds, to allow the shutter to fully open after the cab passes the start/stop sensor when a target vehicle driving at 7 MPH proceeds through the non-stop system. Further, based on the data from start/stop sensor, the fast shutter mechanism is controlled so as to close the at least one shutter at the end of the payload, before a second target vehicle enters the scanning zone. The time for the fast shutter to close is, for example, on the order of no less than 100 milliseconds, preferably on the order of 350 milliseconds. The latter closing time reflects a desired traffic pattern of vehicles allowing for at least 15 feet of separation between the payload trailing edge and the leading edge of the next target vehicle.

Details regarding various embodiments of the fast shutter mechanism, including its failsafe operating design, are disclosed in at least U.S. patent application Ser. No. 10/767,723 entitled, "METHOD AND SYSTEM FOR AUTOMATICALLY SCANNING AND IMAGING THE CONTENTS OF A MOVING TARGET" incorporated by reference above. Additionally, as shown in FIGS. 3a and 3b, the non-stop system may include at least one radiation sensor 50, such as at least one rate meter, for sensing the levels of radiation, i.e., gamma or x-ray, outside of the confines of the scanning zone 20 as a protective measure. An alarm or other indication mechanism is triggered by at least one radiation sensor 50 to alert drivers, passengers, and other third parties to the potential for radiation exposure in the area around each scanning zone 20. Accordingly, the scanning system 10 includes safeguards to allow drivers to move through the scanning lane 20 with very little possibility of radiation overdose. The drivers can move on through the scanning lane without stopping or having to exit their vehicles. The containers carried on such vehicles will be scanned, with the results automatically analyzed by a software system to insure that those containers that have been declared empty are indeed empty and free of false compartments.

By way of example, an operation of the scanning system 10 employing the start/stop sensor 35 and fast shutter mechanism 200 is now described. First, the driver of a vehicle to be inspected can pull up to a Gate Pedestal having the scanning system 10 and begin the check-in process, which can be automated or with a human operator. The driver then pulls away after the check-in is cleared. As the driver is pulling out of the Gate Pedestal area, the fast shutter mechanism 200 is activated based on data from the start/stop sensor 35 as described above. Imaging then starts at a predetermined distance, e.g., 1-2 ft., from the leading edge of the vehicle's container. The fast shutter mechanism 200 is then deactivated or closed a predetermined amount of time after the start/stop sensor 35 determines the trailing edge of the container has cleared the gamma-ray beams emitted by the sources 31, 33. A barrier or traffic signal can be used to prevent the next vehicle from entering the portal until the scan is completed and the fast shutter mechanism 200 is verified closed. Next, the image is transferred to a server and processed for empty-status reporting. When the driver checks in at the final entry gate, the I.D. check data is matched to the processed image and empty status report.

At least part of the source radiation from each of the radiation sources 31, 33 is detected by the respective detector arrays 32, 34 on the towers 25, 30 for imaging the contents of the target vehicle through a process of discrete photon counting. This process is described in detail in each of the patents and applications that have been incorporated herein by reference. By way of example, showing the detectors from each of the detector arrays 32, 34 are coupled through, for example, 16-channel processing units, RS-485 line drivers, and an RS-485 interface card to a computer, wherein the computer processes discrete photon count information received from the detectors and causes a display device to display an image of the contents of a target vehicle, in response thereto. In this particular example, the detectors are coupled in groups of 16 to 16-channel data processing circuits. Preferably, ten (10) groups of detectors are used, five for each of the detector arrays 32, 34. In practice, the number of detectors used can be variable depending on the height of the vehicles to be inspected and the resolution, i.e., number of pixels, in the image desired. In a preferred embodiment, 80 detectors are used in each of the detector arrays 32, 34. The data processing circuits, of which there are preferably ten (10) to match the ten (10) groups of detectors, are each coupled to an RS-485 line driver, which is coupled to an RS-485 interface. The RS-485 interface is embodied on a circuit card located within a computer system. A suitable RS-485 interface is available as Model No. 5 16-485, Part No. 3054 from Seal Level Systems, Inc., and from numerous other vendors under respective model/part number designations.

Each of the radiation detectors is coupled to a preamplifier within the 16-channel data processing circuits. Each preamplifier is coupled to an amplifier, which is in turn coupled to a discriminator. Each discriminator is coupled to a pulse generator, which generates an electrical pulse for each photon received into the radiation detector coupled thereto. The pulse generators within each of the 16-channel data processing circuits is coupled to a line driver. Each of the 16-channel data processing circuits includes its own line driver. The line drivers operate under the programmatic control of a firmware operating system. In operation, the preamplifiers, and amplifiers function in a conventional manner to amplify signals generated by the detectors. Outputs of the amplifiers are passed along to the discriminators, which impose a noise threshold on the amplified signal. Waveforms within the amplified signal that exceed the noise threshold are passed along to the pulse generator, which generates a pulse for each waveform within the amplified signal corresponding to a received gamma-ray or x-ray photon. The line driver passes the pulses generated by each of the pulse generators within a particular 16-channel data processing circuit along to the computer system via the RS-485 interface.

The computer system operates programmatically under the control of a software system. The computer system receives detector pulses from each of the 16-channel data processors, in response to the detection of individual photons by the detectors. The software system processes the incoming detector pulses from both the detector arrays 32 and 34, evaluating their relative amplitudes, i.e., energies, and generates radio graphic image-like display output signals in response thereto. The radio graphic, image-like display output signals are coupled to the graphical display device and is used by the graphical display device to generate images, or graphical representations of the densities, therein of the top and bottom of the container under inspection.

In summary, the system described herein is utilized to generate a single graphical representation, i.e., a "picture," of both the upper and lower images of the respective top and bottom densities of the contents of the target vehicle. Advantageously, this allows for easy visual interpretation of the results of the scanning of the target vehicle under inspection, as opposed to interpreting more subtle indications of the densities within the vehicle under inspection as may be required in prior art systems. The preferred imaging software system, as described next, causes the display of both the top and bottom gamma-ray images of the container on a single graphical image for operator review by the system operator. It is integrated with the scanning system 10 and includes automatic analysis and processing of the gamma-ray images in real time for classification of the imaged cargo containers as "empty" or "non-empty" with a confidence factor from 1 to 100, wherein a value of 100 indicates the greatest confidence. The confidence factor will be further elaborated later.

According to one embodiment of the present invention, utilizing imaging data for a container, e.g., vehicle, collected from, for example, the discrete photon counting systems and processes disclosed in the aforementioned patent and applications incorporated herein by reference, the imaging software system can provide for empty processing through image segmentation and filtering to identify surrounding white space, interior walls, floor, and ceiling of the container in the image. More particularly, the imaging software system can: a) identify the exterior and interior of the container in an image; b) segment the interior of the container into "empty region," i.e., "non-cargo," and "cargo;" and c) analyze the areas of "cargo" to accept or reject the hypothesis that container is empty with a confidence measure via the confidence factor. To achieve such objectives the imaging software system includes at least:

1) image segmentation algorithm for segmenting the top-and-bottom single image into walls of the container, floor of the container, roof of the container, and air within the container in order to separate the exterior and interior of the container and segment the interior of the container into "empty region" and "cargo";
2) morphological operation routines to identify and classify objects, if any, found inside the container by evaluating the density, shape, and position of each object to analyze the areas of "cargo"; and
3) decision routines to report empty or non-empty with a confidence factor from 1-100, whereby all data of objects, if any, in the container is pooled in final classification of the container as empty or not-empty based on operator preferences as mentioned earlier.

Figure 5:
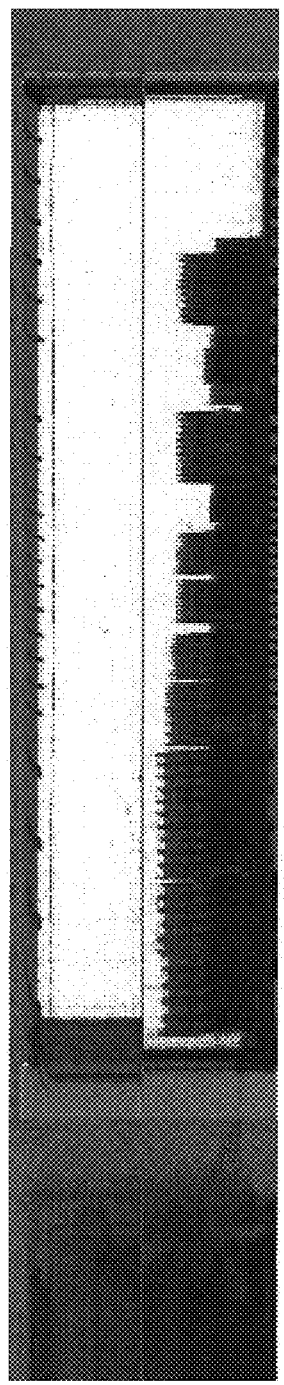
FIG. 5 depicts a sample color-coded image upon the image processing in accordance with an embodiment of the present invention.

Accordingly, the image segmentation algorithm is set up to:

detect and correct bad pixel rows (detectors) and columns (time frames) in an image of the container;
find container region by removing the free-air region that is outside of the container region (which is indicated by a predetermined color, e.g., magenta, in the image, as shown in FIG. 5);
identify the actual container and its interior from the container region by finding: a) front and back walls of the container, i.e. the left and right walls of the container from the two-dimensional container image, (which are indicated by a predetermined color, e.g., cyan, in the image); b) a floor region of the container (which is indicated by a predetermined color, e.g., red, in the image); and c) in case of a full image of the container which includes the top and bottom images, a roof region of the container (which is indicated by a predetermined color, e.g., red, in the image);
perform preliminary segmentation of the inside of the container into "cargo" and "empty" regions (whereby the "cargo" and "empty" regions are indicated by predetermined different colors, e.g., blue for "cargo" and yellow for "empty"); and
if the cargo region is determined to contain objects that have exceeded a preset threshold for non-empty status, the container is classified as non-empty and more detailed analysis can be performed; the preset threshold for "non-empty" status merely depends on the desired system design and operating parameters.

FIG. 5 shows a sample color-coded image (with the aforementioned color examples) that results from the above analysis by the image segmentation algorithm. Each of the aforementioned functions of the image segmentation algorithm is further described next.

Figure 6:
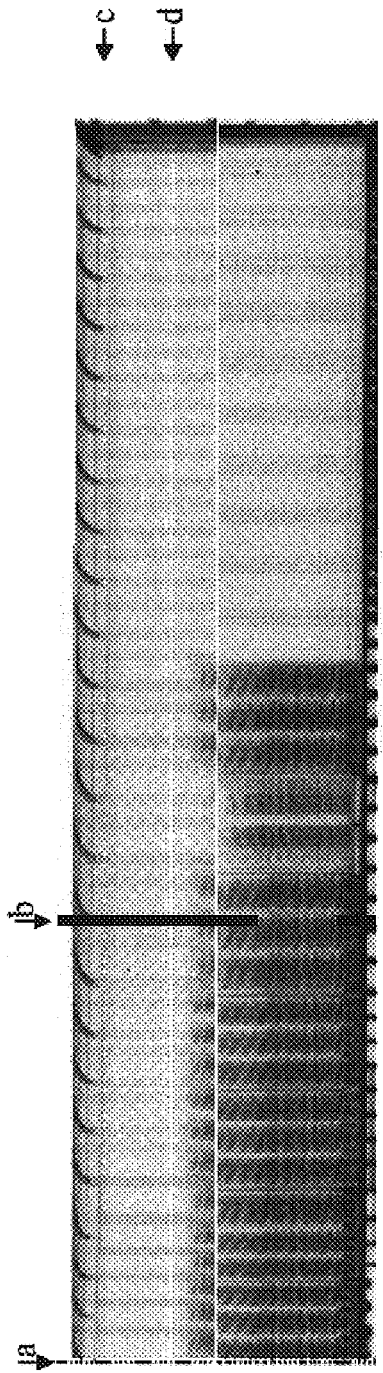
FIG. 6 depicts the detection and fixing of bad rows and columns in a sample image in accordance with an embodiment of the present invention.

To detect bad pixel rows (detectors) in the image, the image segmentation algorithm compares neighboring rows to detect over- and under-performing detectors, marked as d in FIG. 6, detectors with uneven performance, marked as c in FIG. 6, and detectors that return a constant value. To detect bad pixel columns (time frames) in the image, the image segmentation algorithm detects: columns with zero variance, which are usually found at the beginning and/or end of the image, i.e., the far left and right edges of the image; columns with all points being either minimum or maximum intensity, which are usually the first two columns, marked as a in FIG. 6; and rectangular regions with minimum intensity, marked as b in FIG. 6.

According to one embodiment of the present invention, once bad pixel rows in the image are detected, to preserve the image dimensions the bad pixel rows are corrected by replacing them with pixel-to-pixel average values obtained from the neighboring good rows; likewise, once bad pixel columns in the image are detected, to preserve the image dimensions the bad pixel columns are corrected by replacing them with pixel-to-pixel average values obtained from the neighboring good columns. According to another embodiment of the present invention, once bad pixel rows and columns in the image are detected, such rows and columns are completely removed from the image, and the remainder of the image is spliced together for further processing. The aforementioned two embodiments can be carried out automatically by the system; alternatively, the system operator can be notified of the detection of bad rows and/or columns, whereupon the operator can correct the problem in accordance with one of the two embodiments, or be given an option to choose one of the two embodiments to correct the problem. Hardware maintenance can also be performed on the system, e.g., the detector arrays, sources, and/or their alignments to prevent the recurrence of bad rows and/or columns in future images generated by the system.

Figure 7A:
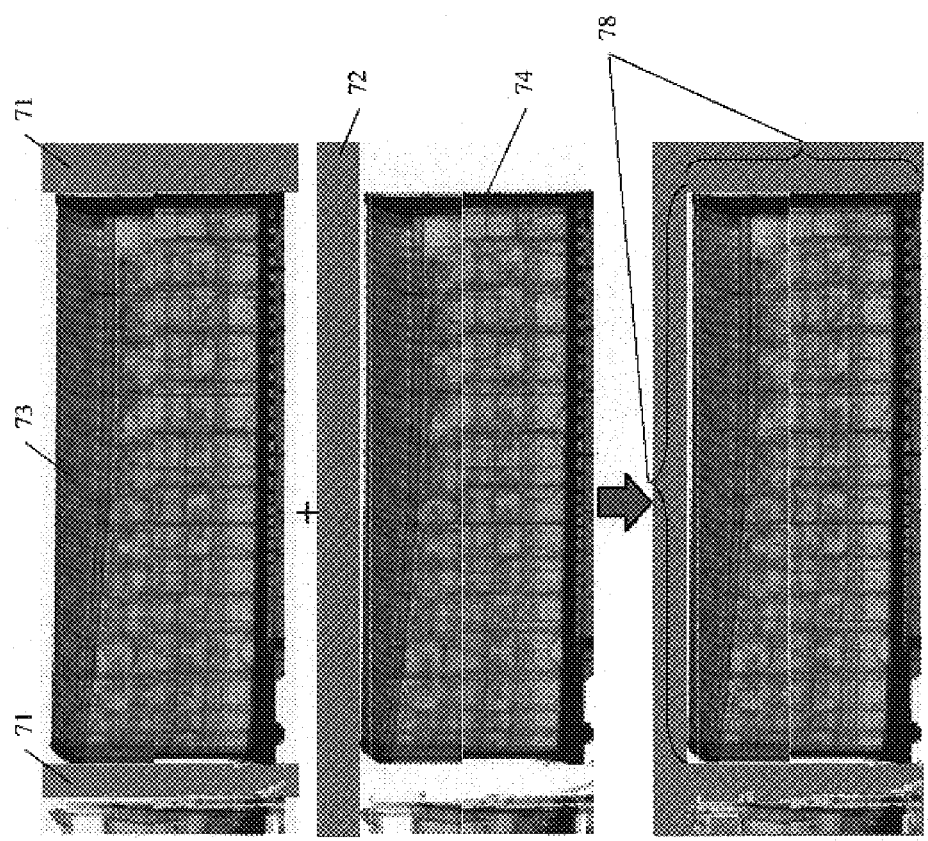
FIG. 7a depicts a sample image showing the identification of free-air, i.e., the region outside of the container region, in accordance with an embodiment of the present invention.

Once bad pixel rows and columns in the image are detected and corrected, the image segmentation algorithm proceeds to identify "free-air" in the image in order to find the container region. As referred herein, "free-air" refers to the region outside of the container region, and it is separate and distinct from the "empty" or "non-cargo" region inside the container. According to one embodiment of the present invention, to remove free-air and identify the container region, the image segmentation algorithm identifies columns with free-air-only by inspecting the mean-to-standard deviation ratio of brightness intensity of each column. With the knowledge that air has high mean intensity value and low standard deviation, columns that have high mean-to-standard deviation ratio values are considered free-air columns. Alternatively, the image segmentation algorithm can identify columns with free-air-only by inspecting the mean value of each column against a mean intensity column threshold for free-air, which can be preset by the system operator based on, e.g., empirical data collected from test images. Those columns that have mean values higher than the preset mean column threshold are then considered free-air columns. Container columns are then defined as the largest contiguous block of non-free-air columns. FIG. 7a shows a sample image with identified columns of free-air 71 and the largest contiguous block of non-free-air columns 73. Similar to identifying free-air-only columns, the image segmentation algorithm also identifies rows with free-air-only by inspecting the mean-to-standard deviation ratio of each row. Those rows that have high ratio values are considered free-air rows. Again, alternatively, the image segmentation algorithm can identify rows with free-air-only by inspecting the mean intensity value of each row against a mean intensity row threshold, which can be preset by the system operator based on empirical data collected from test images. Container rows are then defined as the largest contiguous block of non-free-air rows. FIG. 7a also shows the identified rows of free-air 72 and the largest continuous block of non-free-air rows 74. Non-free-air columns 73 and non-free-air rows 74 are then matched to define a container region 78.

Once a container region is identified in the image, the image segmentation algorithm next performs further image processing to find the front and back walls, i.e., left and right walls, the floor region, and in the case of a full image of the container, a roof region of the actual container in the two-dimensional image.

Figure 8:
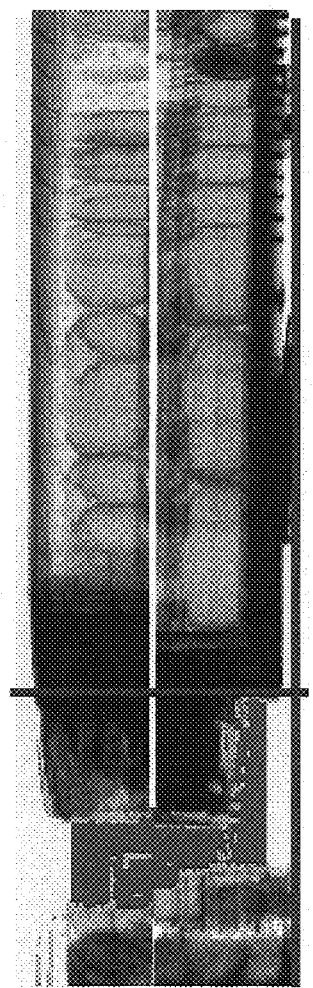
FIGS. 8 and 9 depict a sample color-coded image and a finding of the front and back walls of the target in such image in accordance with an embodiment of the present invention.
Figure 9:
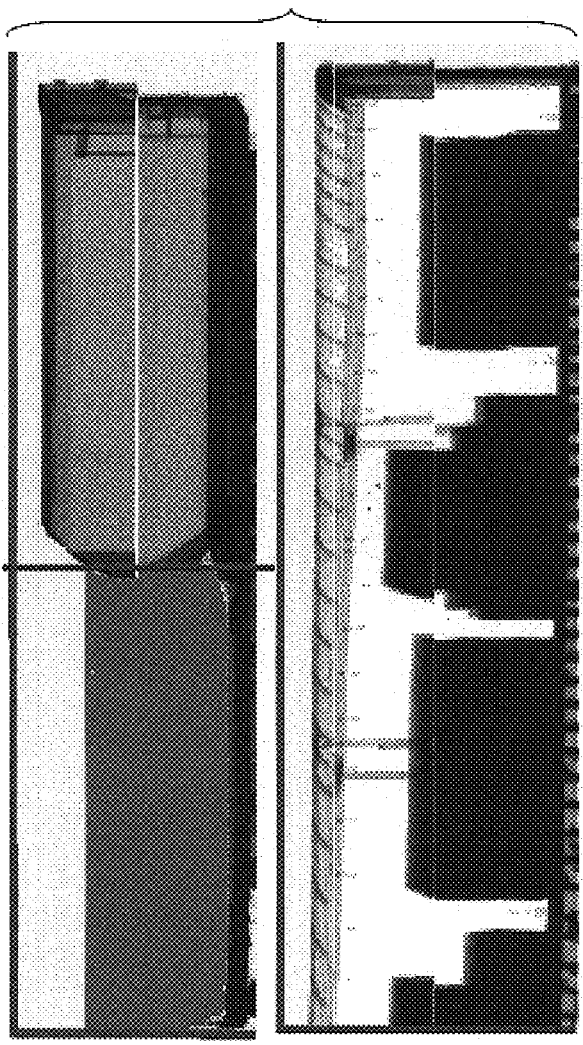

To find the front and back walls of the container, the image segmentation algorithm first finds free-air regions that are connected to the bottom row of the image, in accordance with any one of the embodiments described above for performing such finding. It then analyzes the front/center of the image to determine how far left and right such free-air regions extend in order to determine the front and back walls of the container. These calculations are based on known morphology of the container and vehicle systems and upon the resulting image space representations of these elements. Such calculations are well known in the art and can include a number of free parameters that can be set or tuned by the system operator to provide optimum detection of the walls and the cargo, as also known in the art. FIG. 8 shows a sample color-coded image wherein the bottom row of the image is marked in blue, the free-air regions are marked in green and yellow, and the front/center of the image is marked as a vertical red line. The image segmentation algorithm further find free-air regions that are connected to both the first column and the top row of the image before analyzing the front/center of the image to determine how far left and right such free-air regions extend in order to determine the front and back walls of the container. FIG. 9 shows a sample color-coded image (top image in FIG. 9) wherein the first column and bottom row of the image are marked in blue, the free-air regions are marked in green and yellow, and the front/center of the image is marked as a vertical red line. FIG. 9 further shows the resulting image (bottom image in FIG. 9) subsequent to the wall finding based on the above approach.

Figure 7B:
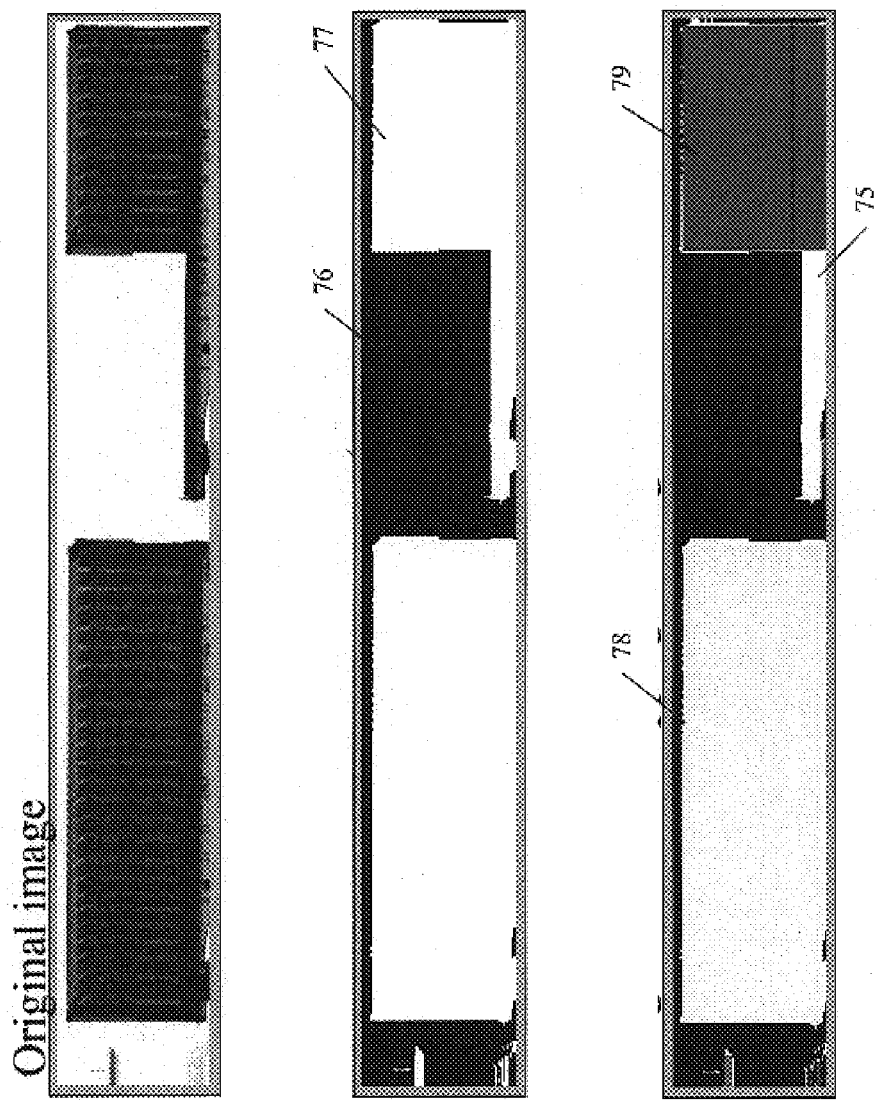
FIG. 7b depicts a sample image showing the identification of free-air, i.e., the region outside of the container region, in accordance with another embodiment of the present invention.

According to an alternative embodiment of the present invention, as depicted in FIG. 7b, to remove free-air and identify the container region, the image segmentation algorithm uses a free-air threshold pixel intensity value to separate and distinguish free-air pixels (with intensity values at or above such threshold) from the rest of the image, i.e., the container region. FIG. 7b shows that the free-air region is marked in black 76 and the rest of the image is marked in white 77. Next, the image segmentation algorithm uses each pixel in the white region to identify the size of the largest all-white block (square or rectangular) with such pixel serving as a corner of the identified all-white block. The image segmentation algorithm then identify all non-overlapping white blocks that are above a predetermined size, as set by the system operation, as containers. For example, as shown in FIG. 7b, block 78 is above the predetermined size and identified as a container, whereas block 79 is below the predetermined size and not identified as a container. In another example, if the predetermined size is set to be less than the size of block 79 and/or input system parameters indicate that there may be more than one container in the image (e.g., for a double-trailer vehicle), then both blocks 78 and 79 would be identified as containers. In this alternative embodiment, the image segmentation algorithm finds the front and back walls of the container by first determining the mean intensity value of each pixel column inside each white block, i.e., container, and plotting the mean column values on a one-dimensional curve. The walls of the container are then identified by locating the local minima on the one-dimensional curve, based on an understanding that container edges or walls would appear darker on the container image.

The various embodiments described above for removing free-air and finding the container region in the image can be applied alternatively or successively to enhance the finding of the container region in the image.

Figure 10:
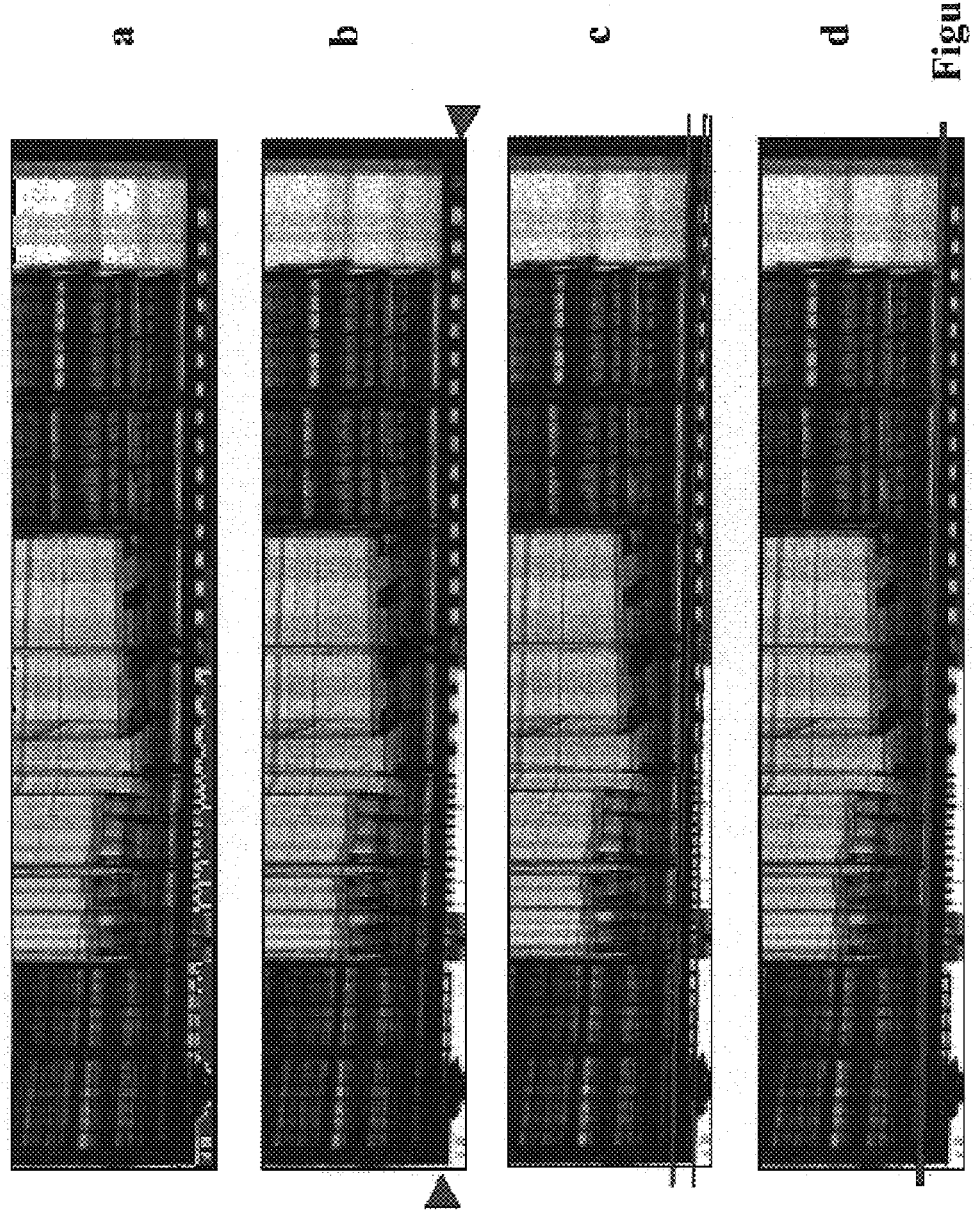
FIGS. 10a-d depict the finding of the floor of the target in accordance with an embodiment of the present invention.

To find the floor region of the container, the image segmentation algorithm first marks free-air under the container region, via one of the embodiments described earlier. However, in this mode small segments of rows or columns are sampled. FIG. 10a shows a sample image of the container with free-air marked in red below the container region. The image segmentation algorithm then determines how high the free-air region extends in the front (i.e., left side of the image) and back (i.e., right side of the image) parts of the container in order to exclude such free-air region and define the cargo inspection region, based on the earlier determination of the front and back walls of the container. FIG. 10b shows the same sample image of the container with the front part of the container (i.e., the left side of the image, marked by the left red arrow) having free-air extending higher than the back part of the container (i.e., the right side of the image, marked by the right red arrow). The image segmentation algorithm next evaluates all possible combinations of floor thickness and angles that do not exceed predefined floor thickness and angle of known containers, which are provided by the system operator, to form lines indicating floor candidates. It then chooses either the most continuous, darkest line in the image as the floor region, or if many candidates are found, shown as multiple red lines in FIG. 10c—the highest continuous darkest line i.e., the highest continuous line with lowest mean intensity, least number of "free-air" pixels, and largest gradient, as the floor region, shown as one dark red line in FIG. 10d.

According to one embodiment of the present invention, floor finding can be enhanced with the image segmentation algorithm further performing flat-bed trailer detection to identify vehicles that have trailers underneath containers. In this embodiment, such trailers are already identified as one of the largest all-white blocks as described earlier with reference to FIG. 7b. A trailer is then identified as "long" rectangles underneath each identified container that is longer than and overlaps with such container. FIG. 7b shows an identified trailer 75, which extends beneath and overlaps with container block 79.

Figure 11:
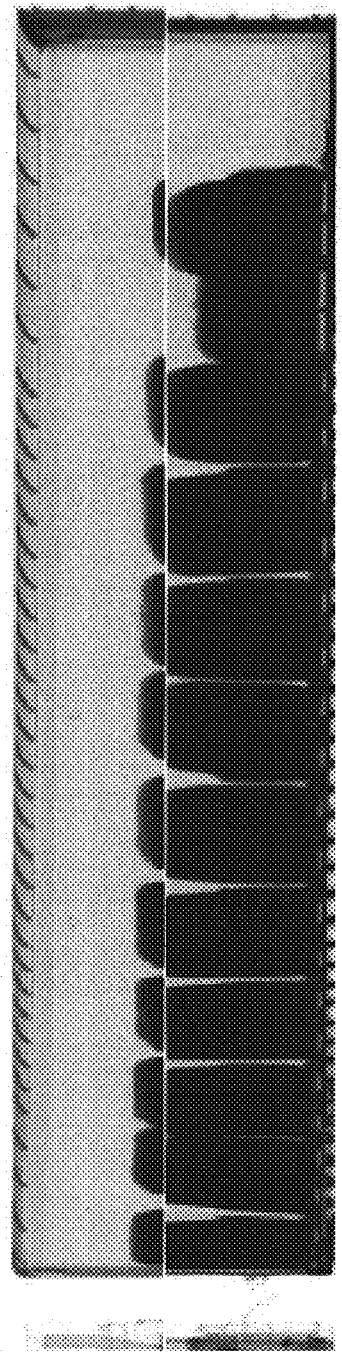
FIG. 11 depicts a typical target image from which the ceiling of the target is found in accordance with an embodiment of the present invention.

To find the roof or ceiling region of the container, the image segmentation algorithm first attempt to search the image for a roof line in spatial domain, starting from the roof-free-air line at the top, as found from one or more of the aforementioned free-air removal embodiments. This search relies on the typical cargo containers having roof joists or ribs that appear in the image as diagonal lines slanting to the left or right. From the roof-free-air line, the image segmentation algorithm searches the image, lowering (and tilting if necessary) the potential roof line row-by-row in the image, so long as the next lower row has higher correlation in intensity values with the previous row if shifted to the left or right (depending on the joist slope as provided by the system operator), as shown in FIG. 11. If the next row does not have a higher correlation with the previous row if shifted to the left, or right, then the next row is determined to be the roof line of the container in the image.

If the search for the roof region in "time" domain fails, the image segmentation algorithm continues to search the image for a roof line in "frequency" domain, through Fast Fourier Transformation (FFT) of intensity of each row in container region of the image, whereby the dominant frequency (i.e., the frequency associated with the maximum amplitude) of upper rows is identified. This frequency is assumed to correspond to the presence of roof joists or ribs in the image. Where such dominant frequency "suddenly" disappears from one row to another in a predetermined number of upper rows, that is set to be the roof line, i.e., where the roof ends.

Figure 14:
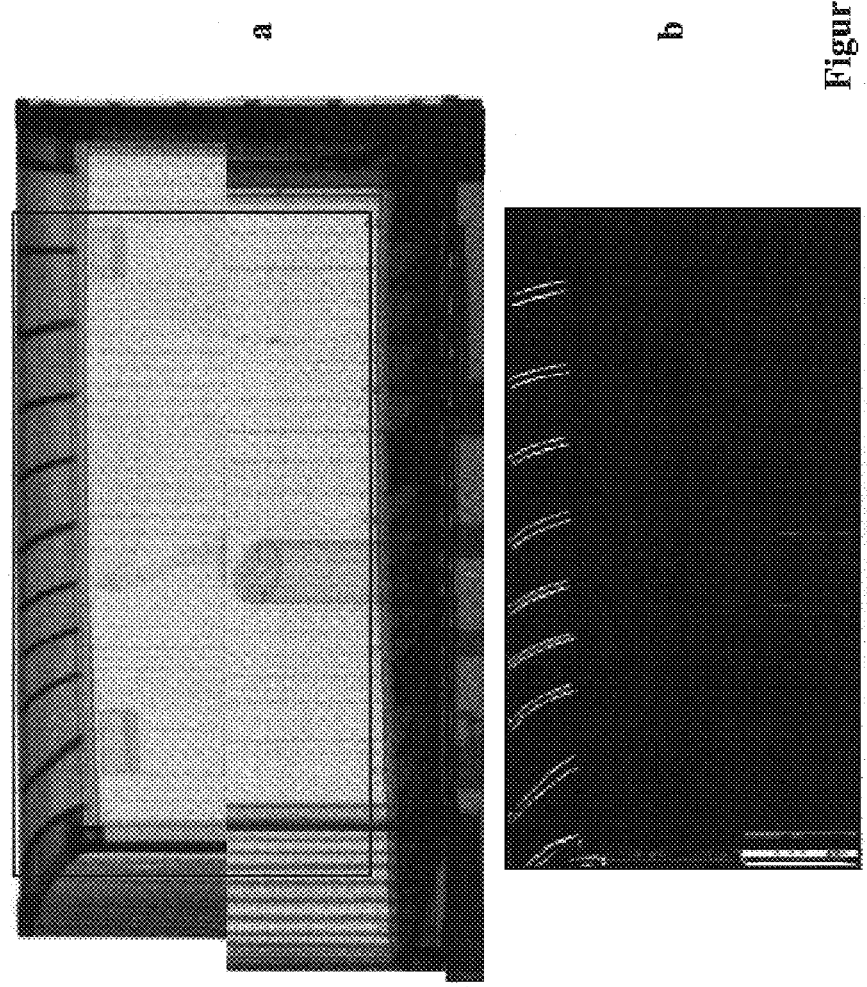
FIGS. 14a-c depict the finding of the ceiling of the target in accordance with another embodiment of the present invention.
Figure 14C:
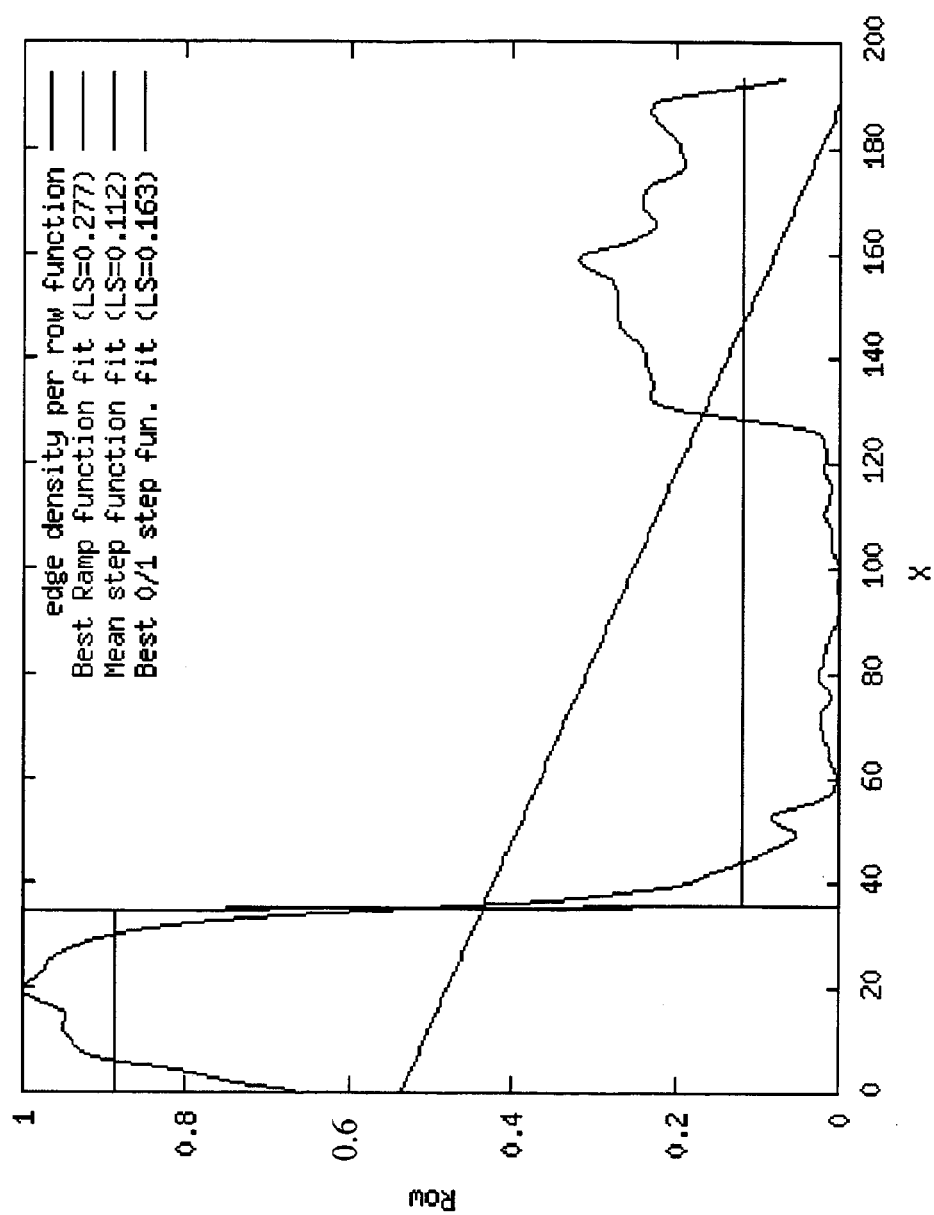

In an alternative embodiment, the image segmentation algorithm can search for the roof line by edge detection, as depicted in FIGS. 14a-c. In this alternative embodiment, the image segmentation algorithm first crops the sides and bottom of the image to avoid wall and floor interference, as shown in FIG. 14a. Next, the vertical edges and diagonal edges (either right-sloping or left-sloping, depending on the joist slope as provided by the system operator) of the cropped image are found, as shown in FIG. 14b, using standard edge detection techniques as known in the art. One such technique is the Sobel method, which relays the detection of high first derivatives in predefined directions and provides the direction and magnitude of the intensity gradient at each pixel, as understood in the art. Based on the findings of vertical and diagonal edges, the image segmentation algorithm then calculates the mean edge density value of each row in the cropped image, represented by the red graph depicting the edge density per row function in FIG. 14c. The image segmentation algorithm then fits the best ramp or linear function, represented by the green graph in FIG. 14c, and the best step function, represented by the cyan graph in FIG. 14c, to the edge intensity profile. The least-square method is then applied to the edge density function to best fit it to the step and ramp functions. If the edge intensity profile fits more to the step function than the ramp (or linear) function, then the roof line is found at the row where the stepping occurs.

Next, the image segmentation algorithm performs preliminary segmentation of the inside of the container into "cargo" and "empty" regions through the application of enhancement filters and intensity, contrast, signal-to-noise, and directional gradient tests to local regions in the image in an adaptive, iterative process as understood in the art, whereby colors are assigned to regions based upon empirically-derived, preset threshold conditions in the algorithm as desired by the system operator based on, e.g., previous review of test images. For error checking and quality control, at this point the image segmentation algorithm also identifies any problems in the imaging of the container and report them as errors to the system operator. Such errors include but are not limited to: the container has no front and/or back walls or such walls cannot be identified; the container has no floor and/or roof or such floor/roof cannot be identified; or image segmentation is not possible. These errors may be due to the trailer being too short and only one end is present, the trailer is a flat-bed type (regardless whether it is empty or full), bad image rows due to bad detectors, bad image regions (e.g., rectangular all-black regions), and/or noisy images. The errors are reported to the system operator and further included in the decision routines for determining a confidence factor as described later.

As with the various embodiments for removing free-air and finding the container region, the aforementioned various embodiments for finding front and back walls of the container, floor regions, and ceiling regions, respectively, can be applied alternatively or successively to enhance the findings of the container walls, roof, and floor. There are instances in which the image segmentation algorithm cannot detect the walls, roof, and/or floor of a container and triggers an imaging error. In such instances, the container can be determined to be "non-empty" by the system operator and/or predefined system parameters based on the triggered error, and no further image processing is needed to determine the relative locations of the walls, roof, and/or floor of the container. It is only in those instances where the container is mostly empty that the relative locations of the walls, roof, and/or floor of the container need to be identified in order to enhance a finding of "cargo" in the container, as described next.

Figure 12:
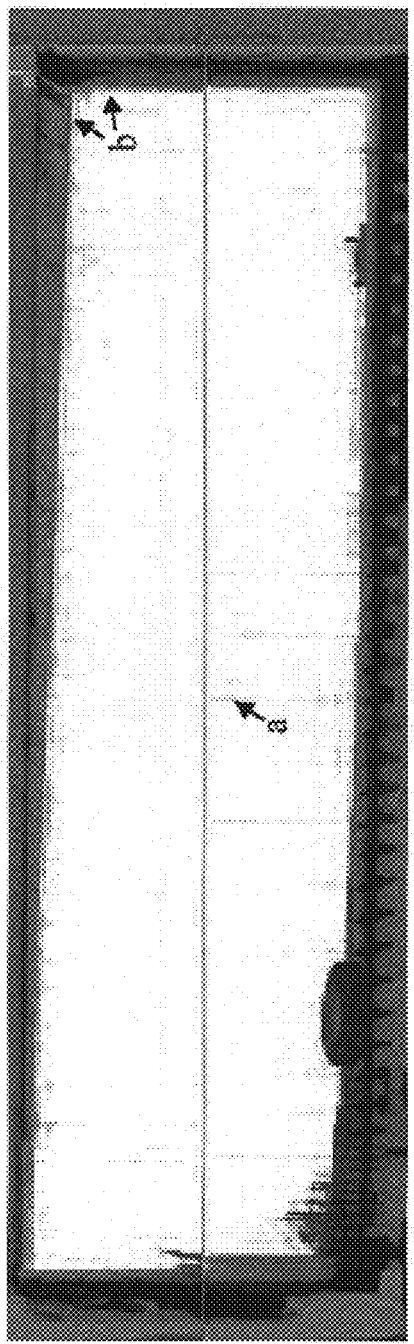
FIG. 12 depicts further image processing when the target contains less than ¼ of its capacity in accordance with an embodiment of the present invention.

As mentioned earlier, if the cargo region is determined to contain objects that have exceeded the preset threshold for non-empty status, closer inspection is performed by the image segmentation algorithm, whereby: (a) vertical patterns inside the container are smoothed, shown as a in FIG. 12; (b) the wall, roof, and floor positions of the container are recalculated, shown as the green regions b in FIG. 12; (c) new threshold is calculated and the container is re-segmented into cargo and empty regions based on the new threshold. Morphology routines are then used to identify and classify objects found inside the container by evaluating the density, shape, and position of each object to analyze the areas of "cargo."

Figure 13:
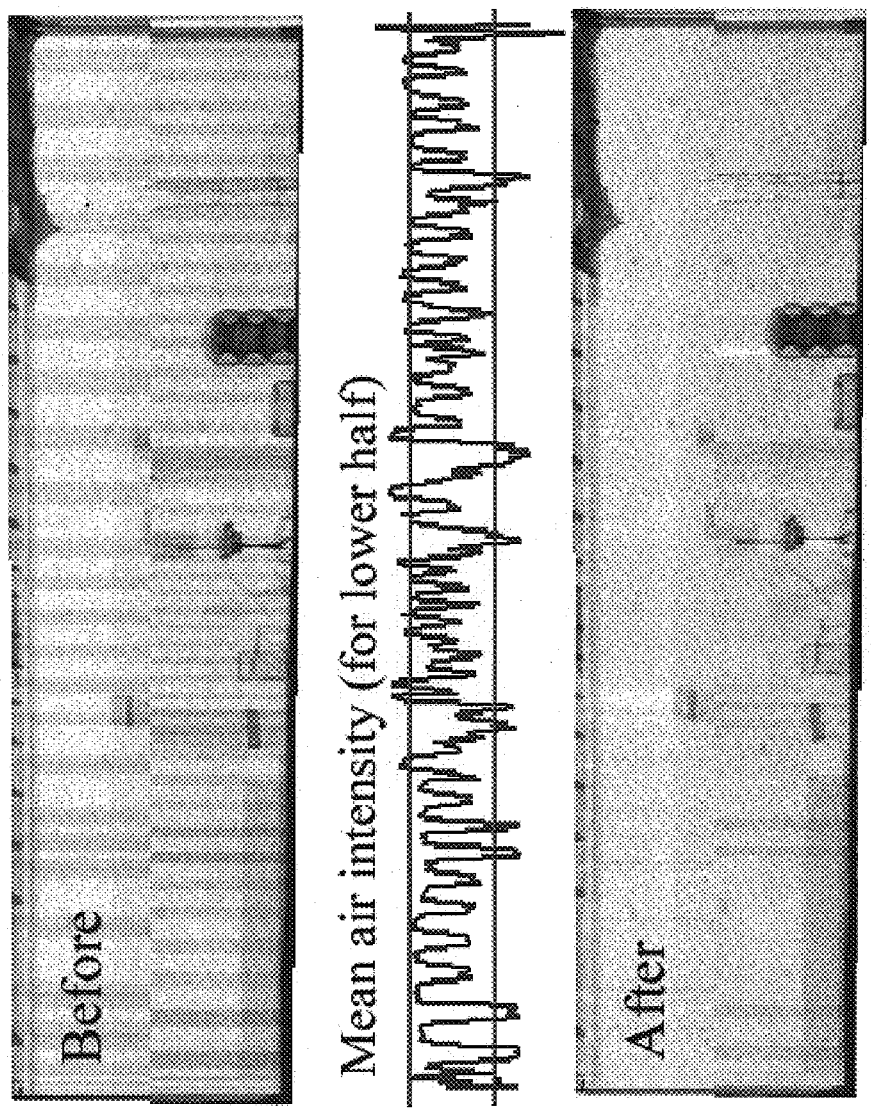
FIG. 13 depicts the smoothing of vertical patterns in the target image in accordance with an embodiment of the present invention.

To smooth out the vertical patterns, the inventors have found that many container images that are obtained by the discrete photon counting system and process disclosed in the aforementioned patent and applications have characteristic vertical patterns in empty regions of the container. These vertical patterns may result from the imaging of ribs or some other forms of reinforcement typically found in side walls of the container. Thus, as shown in FIG. 13, in order to smooth out and remove those characteristic vertical patterns in the empty regions of the container (to avoid confusion with actual cargo in the container), as initially determined from the aforementioned preliminary segmentation, the image segmentation algorithm first calculates the mean intensity of air in each pixel column of the empty regions inside the container, shown as the blue graph in FIG. 13. Next, the image segmentation algorithm truncates the blue graph by trimming the extreme peaks from the blue graph, i.e., those outside the red limiting lines in FIG. 13. The red limiting lines are system parameters that can be set by the system operator. Next, the image segmentation algorithm uses the truncated blue graph to normalize the column means of the empty regions in the container by dividing the intensity values of pixels in each column in the empty regions by the corresponding column mean (i.e., point on the blue graph that corresponds with each column. FIG. 13 also shows an image of the container before the smoothing of the vertical patterns and after.

To re-calculate the wall, roof, and floor positions, the previous determination that the container is mostly empty is advantageously used. For this calculation, each row and column adjacent to the walls, floor, and/or roof of the container is evaluated, with the vertical patterns in the empty region already removed. If most pixels, e.g., 80-90%, another parameter preset by the system operator, in each such row or column have been classified as "cargo", then such row or column is re-classified as the adjacent wall, floor, or roof of the container. At this point, a new cargo/empty-region threshold inside the container is calculated based on the above re-classification of rows and columns, and the container is re-segmented into "cargo" and "empty region" based on the new threshold.

The purpose of the morphological operation routines is to identify and classify objects found inside the container by evaluating the density, shape, and position of each object to analyze the areas of re-segmented "cargo." Such morphological operations are known and understood in the art and will not be described here. Different weights are then given for each object pixel based on such evaluation. This is done to recognize known container parts that are often confused with cargo, e.g., roll-up doors, hitch parts, wall reinforcement, and exclude them.

In alternative embodiment, if the cargo region is determined to contain objects that have exceeded the preset threshold for non-empty status, closer inspection is performed by the image segmentation algorithm, whereby: a) image pixels inside the container are grouped into homogeneous segments, using known image segmentation techniques, such as the seeded region growing method; b) an attributed relational graph (ARG) is built, storing statistical and morphological information about each homogeneous segment and its connection to neighboring homogeneous segments; and c) predefined rules regarding the statistical and morphological information and neighboring connections are then used to re-classify each homogeneous segment, or group of homogeneous segments, in the container as "cargo" or "empty" region.

All of the resulting data from the aforementioned closer inspection of the image and the morphology routines is pooled into a single "weighted cargo volume" measure for use by the decision routines in the final classification of the container as empty or non-empty with a confidence factor from 1 to 100. For example, Empty[75] indicates the container is deemed empty with a confidence factor of 75, and Non-Empty[90] indicates the container is deemed not empty with a confidence factor of 90. For containers that are partially loaded with cargo, i.e., obviously not empty, the container status would return a Non-Empty[100]. For empty or for very small amounts of dunnage, the return should be Empty[x], where x=90-95. Because false positives are to be minimized, the confidence factor for Non-Empty must be high before an indication is activated.

Thus, the confidence factor is directed to the confidence in the image processing and analysis and the resulting volume percentage of the container that is deemed full, i.e., containing "cargo." In other words, the confidence factor is not directed to the confidence in the classification of a container as "empty" or "non-empty," which is based on a threshold preset by the system operator in the decision routines. For example, if the preset threshold for classifying a container as "non-empty" is 2% full, for any image processing and analysis that returns a value of or near 2%, the decision routines will return a Non-Empty[y] or Empty[y] where y will be a low number closer to 1 than to 100. This is because there is low confidence in a determination that a container is "non-empty" at such low volume. However, for any image processing and analysis that returns a value of percentage full that is much higher than 2% full, the decision routines will return a Non-Empty [z] where z will be a high number closer to 100 than to 1 to indicate a higher confidence in the returned percentage full value. Consequently, the assignment of a value to the confidence factor for an image is based on design and system parameters.

According to another embodiment of the present invention, utilizing imaging data for a container, e.g., vehicle, collected from, for example, the discrete photon counting system and process disclosed in the aforementioned patent and applications and herein incorporated by reference, the imaging software system first normalizes the image by converting image pixel values to brightness intensity percentages from 0-100%. As disclosed in at least one or more of the aforementioned patents and applications that are herein incorporated by references, the pixel value for each image pixel is based on the number of photon counts received from the detector array 32 or 34 for that particular image pixel. Next, the imaging software system provides categorization of images as either candidates for empty processing, or clearly non-empty containers. This categorization includes the thresholding of each image into three (3) binary images:

Dense Image: All pixels in the image with a value from 0 to 50% of the maximum intensity value are given a value of 1 and all other pixels are given a value of 0. This is the denser part of the container.

Light Image All pixels with a value from 50% to 90% of the maximum intensity value are given a value of 1 and all other pixels are given a value of 0. This includes less dense objects and the container walls.

Background Image: All pixels above 90% of the maximum intensity value are given a value of 1 and all other pixels are given a value of 0. These are the background pixels and should be ignored.

A density ratio is then determined by comparing the number of 1's in the Dense Image to the number of 1's in the Light Image. If this ratio exceeds 0.3, the image is considered full, i.e., the container is clearly non-empty. If the ratio is less than 0.3, the image is considered non-full and a candidate for empty processing, whereby further inspection of image is done to determine if the container is empty.

Once an image is categorized as a candidate for empty processing, the imaging software system then identifies the inner container by identifying front and back walls, ceiling, and floor of the container, i.e., determining a boundary of the container to identify the inner container, using the brightness intensity percentage for each pixel in the image of the target. Given the brightness intensity percentages for all of the inner container image pixels, a row of pixels above the identified floor of the container in the lower image is divided into predefined N segments and the average intensity for the N segments is calculated. If any of the individual segment's brightness is less than a predefined threshold θ, then the container is identified as non-empty. The processed images may be in various formats, such as .tiff, .bmp, .jpg and the like, as desired.

For both of the embodiments described above, the process for determining empty or non-empty status takes on the order of seconds and accommodates both moving and non-moving container imaging scenarios. Additionally, for containers identified as non-empty or for images identified as empty but with a low confidence factor, the images thereof can be automatically presented to a reviewer with suspect regions identified through, e.g., outlining, pseudocolor, or a similar method.

Further, the aforementioned various embodiments of the imaging segmentation algorithm and morphological operations or morphology routines can be simulated and implemented on a computing device via computer-executable program instructions using high-level programming language such as Matlab, S, R, etc. or low-level program language such as C, C++, C#, Java, FORTRAN, etc., with possible help from available image processing libraries such as Intel Open Computer Vision (CV) library (an open source library that contains a thorough collection of fast algorithms for image processing, matrix manipulation, structural analysis, image segmentation, and object recognition), LEADTOOL library, etc., as understood in the art based on the present disclosure.

The computer device can include a memory, which can be a computer-readable medium (CRM), such as a random access memory (RAM), coupled to a processor. The processor executes computer-executable program instructions stored in the computing device, such as the device memory, as program code. Such processor may include a microprocessor, an ASIC, and state machines. Such processors include, or may be in communication with, media, for example computer-readable media, which stores instructions that, when executed by the processor, cause the processor to perform the image segmentation algorithm, morphology routines, decision routines described herein. Moreover, the processor can be any of a number of computer processors, such as processors from Intel Corporation of Santa Clara, Calif. and Motorola Corporation of Schaumburg, Ill. Embodiments of computer-readable media include, but are not limited to, an electronic, optical, magnetic, or other storage or transmission device capable of providing the device processor with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, switch, private or public network, or other transmission device or channel, both wired and wireless.

Although the invention has been described with reference to these preferred embodiments, other embodiments could be made by those in the art to achieve the same or similar results. Variations and modifications of the present invention will be apparent to one skilled in the art based on this disclosure, and the present invention encompasses all such modifications and equivalents.

The invention claimed is:

1. A method for processing an empty-status of a target comprising:
   directing radiation at a target with at least one radiation source;
   detecting the directed radiation that passes through the target with at least one radiation detector;
   generating an image of the target, the image including a plurality of pixels arranged in rows and columns, each of the plurality of pixels is assigned a brightness intensity based on the detecting; and
   processing the target image based on the brightness intensity of each of the plurality of pixels to declare the target as empty or non-empty in accordance with a first predetermined criterion, the processing including:
   identifying a region of the target in the target image; and
   determining an interior of the target from the identified target region, including:
      identifying a first wall and a second wall of the target;
      identifying a floor of the target; and
      identifying a ceiling of the target, including:
         determining whether a correlation in mean brightness intensity from one pixel row to an adjacent lower pixel row in the container region meets a predetermined correlation threshold when the one pixel row is shifted to right or left, beginning from a top of the container region; and
         upon determining that the correlation in mean brightness intensity between one of the upper pixel rows in the container region when shifted to the left or right and an adjacent lower one of the pixels no longer meets the predetermined correlation, identifying the one upper pixel row as the target ceiling.

2. The method of claim 1, the generating the target image comprises:
   detecting any pixel row in the target image that is undesirable based on at least a second predetermined criterion;
   correcting the undesirable pixel row;
   detecting any pixel column in the target image that is undesirable based on at least a third predetermined criterion; and
   correcting the undesirable pixel column.

3. The method of claim 2, the correcting the undesirable pixel row comprises replacing the undesirable pixel row with a pixel row having brightness intensity averaged from a plurality of neighboring rows that are desirable based on the at least second predetermined criterion; and the correcting the undesirable pixel column comprises replacing the undesirable pixel column with pixel column having brightness intensity averaged from a plurality of neighboring rows that are desirable based on the at least third predetermined criterion.

4. The method of claim 2, the correcting the undesirable pixel row comprises removing the undesirable pixel row from the target image and splicing together the remainder pixel rows in the target image; and the correcting the undesirable pixel column comprises removing the undesirable pixel column from the target image and splicing together the remainder pixel columns in the target image.

5. The method of claim 1, the identifying the target region comprises:

first inspecting a mean-to-standard deviation ratio of brightness intensity of each pixel column in the target image; and second inspecting a mean-to-standard deviation ratio of brightness intensity of each pixel row in the target image.

6. The method of claim 1, the identifying the target region comprises:

first comparing a mean value of brightness intensity of each pixel row in the target image against a predetermined mean brightness intensity row threshold; and second comparing a mean value of brightness intensity of each pixel column in the target image against a predetermined mean brightness intensity column threshold.

7. The method of claim 1, the identifying the target region comprises:

comparing the brightness intensity of each pixel in the target image against a predetermined threshold value representing a brightness intensity of a pixel outside of the target; and identifying the target region as a block of those pixels in the target image that have brightness intensity less than the predetermined threshold value.

8. The method of claim 1, the identifying the first and second walls of the target comprises:

identifying the first and second walls of the target based on the identifying the target region and predetermined morphology of the target.

9. The method of claim 7, the determining the target interior comprises:

identifying a first wall and a second wall of the target by:
plotting a mean brightness intensity for each pixel column in the pixel block on a curve; and
identifying the first and second walls of the target as local minima on the curve.

10. The method of claim 1, the identifying the target floor further comprises: determining a plurality of regions in the target image that are below the identified container regions;

evaluating the plurality of regions for all possible combinations of floor thickness and floor angle that do not exceed predetermined floor thickness and angle to generate one or more floor candidates; and selecting one of the one or more floor candidates as the target floor based on at least a fourth predetermined criterion.

11. A system for imaging a target comprising:

a radiation source configured to direct radiation at the target;

a detector configured to detect at least a portion of the radiation from the radiation source that passes through the target;

a computer readable medium on which is encoded program code, the program code comprising:

program code for generating an image of the target, the image including a plurality of pixels arranged in rows and columns, each of the plurality of pixels is assigned a brightness intensity based on the detecting; and program code for processing the target image based on the brightness intensity of each of the plurality of pixels to declare the target as empty or non-empty in accordance with a first predetermined criterion, including:

program code for identifying a region of the target in the target image;

program code for determining an interior of the target from the identified target region, including:

program code for identifying a first wall and a second wall of the target;

program code for identifying a floor of the target;

program code for identifying a ceiling of the target, including:

program code for determining whether a correlation in mean brightness intensity from one pixel row to an adjacent lower pixel row in the container region meets a predetermined correlation threshold when the one pixel row is shifted to right or left, beginning from a top of the container region; and upon determining that the correlation in mean brightness intensity between one of the upper pixel rows in the container region when shifted to the left or right and an adjacent lower one of the pixels no longer meets the predetermined correlation, program code identifying the one upper pixel row as the target ceiling.

12. The system of claim 11, the program code for generating the target image comprises:

program code for detecting any pixel row in the target image that is undesirable based on at least a second predetermined criterion;

program code for correcting the undesirable pixel row;

program code for detecting any pixel column in the target image that is undesirable based on at least a third predetermined criterion; and program code for correcting the undesirable pixel column.

13. The system of claim 12, the program code for correcting the undesirable pixel row comprises program code for replacing the undesirable pixel row with a pixel row having brightness intensity averaged from a plurality of neighboring rows that are desirable based on the at least second predetermined criterion; and the program code for correcting the undesirable pixel column comprises program code for replacing the undesirable pixel column with a pixel column having brightness intensity averaged from a plurality of neighboring rows that are desirable based on the at least third predetermined criterion.

14. The system of claim 12, the program code for correcting the undesirable pixel row comprises program code for removing the undesirable pixel row from target image and splicing together the remainder pixel rows in the target image; and the program code for correcting the undesirable pixel column comprises program code for removing the undesirable pixel column from the target image and splicing together the remainder pixel columns in the target image.

15. The system of claim 11, the program code for identifying the target region comprises:
program code for first inspecting a mean-to-standard deviation ratio of brightness intensity of each pixel column in the target image; and
program code for second inspecting a mean-to-standard deviation ratio of brightness intensity of each pixel row in the target image.

16. The system of claim 11, the program code for identifying the target region comprises:
program code for first comparing a mean value of brightness intensity of each pixel row in the target image against a predetermined mean brightness intensity row threshold; and
program code for second comparing a mean value of brightness intensity of each pixel column in the target image against a predetermined mean brightness intensity column threshold.

17. The system of claim 11, the program code for identifying the target region comprises:
program code for comparing the brightness intensity of each pixel in the target image against a predetermined threshold value representing a brightness intensity of a pixel outside of the target; and
program code for identifying the target region as a block of those pixels in the target image that have brightness intensity less than the predetermined threshold value.

18. The system of claim 11, the program code for identifying the first and second walls of the target comprises:
program code for identifying the first and second walls of the target based on the identifying the target region and predetermined morphology of the target.

19. The system of claim 17, the program code for determining the target interior comprises:
program code identifying a first wall and second wall of the target by:
plotting a mean brightness intensity for each pixel column in the pixel block on a curve; and
identifying the first and second walls of the target as local minima on the curve.

20. The system of claim 11, the program code for identifying the target floor further comprises:
program code for determining a plurality of regions in the target image that are below the identified container regions;
program code for evaluating the plurality of regions for all possible combinations of floor thickness and floor angle that do not exceed predetermined floor thickness and angle to generate one or more floor candidates; and
program code for selecting one of the one or move floor candidates as the target floor based on at least a fourth predetermined criterion.

21. The system of claim 11, the program code for identifying the target ceiling comprises:
program code for determining vertical and diagonal edge pixels in the container region;
program code for calculating a mean edge density function for all pixel rows in the container region based on the determined vertical and diagonal edges;

program code for fitting a best ramp function to the mean edge density function; and
program code for identifying the target ceiling from the best ramp function.

22. A method for processing an empty-status of a target comprising:
directing radiation at a target with at least one radiation source;
detecting the directed radiation that passes through the target with at least one radiation detector;
generating an image of the target, the image including a plurality of pixels arranged in rows and columns, each of the plurality of pixels is assigned a brightness intensity based on the detecting; and
processing the target image based on the brightness intensity of each of the plurality of pixels to declare the target as empty or non-empty in accordance with a first predetermined criterion, the processing including:
identifying a region of the target in the target image; and
determining an interior of the target from the identified target region including:
identifying a first wall and a second wall of the target;
identifying a floor of the target; and
identifying a ceiling of the target including:
performing a Fast Fourier Transformation (FFT) of the brightness intensity of each pixel row in the target region;
identifying a dominant frequency from the FFT of a predetermined number of upper rows in the target region;
identifying a disappearance of dominant frequency from one of the predetermined upper rows to another one of the predetermined upper rows; and
selecting the one of the predetermined upper rows as the target ceiling.

23. A method for processing an empty-status of a target comprising:
directing radiation at a target with at least one radiation source;
detecting the directed radiation that passes through the target with at least one radiation detector;
generating an image of the target, the image including a plurality of pixels arranged in rows and columns, each of the plurality of pixels is assigned a brightness intensity based on the detecting; and
processing the target image based on the brightness intensity of each of the plurality of pixels to declare the target as empty or non-empty in accordance with a first predetermined criterion, the processing including:
identifying a region of the target in the target image; and
determining an interior of the target from the identified target region, including:
identifying a first wall and a second wall of the target;
identifying a floor of the target; and
identifying a ceiling of the target, including:
determining vertical and diagonal edge pixels in the container region;
calculating a mean edge density function for all pixel rows in the container region based on the determined vertical and diagonal edges;
fitting a best ramp function to the mean edge density function; and
identifying the target ceiling from the best ramp function.

24. A method for processing an empty-status of a target comprising:
- directing radiation at a target with at least one radiation source;
- detecting the directed radiation that passes through the target with at least one radiation detector;
- generating an image of the target, the image including a plurality of pixels arranged in rows and columns, each of the plurality of pixels is assigned a brightness intensity based on the detecting; and
- processing the target image based on the brightness intensity of each of the plurality of pixels to declare the target as empty or non-empty in accordance with a first predetermined criterion, the processing including:
  - identifying a region of the target in the target image;
  - determining an interior of the target from the identified target region;
  - performing a first segmentation of the target interior into empty and non-empty regions;
  - reporting any problems with the processing of the target image;
  - determining whether the non-empty region exceeds a predetermined threshold percentage of the target;
  - upon the non-empty region exceeding the predetermined threshold percentage, classifying the target as non-empty;
  - upon the non-empty region not exceeding the predetermined threshold percentage additionally processing the target image to evaluate the non-empty region including:
    - removing any vertical patterns from the empty region of the target interior;
    - re-determining the target interior based at least on the removing the vertical patterns from the empty region of the target interior;
    - performing a second segmentation of the target interior into new empty and new non-empty regions based on the re-determining the target interior;
    - performing morphological operations to the new non-empty region;
    - identifying one or more objects in the non-empty region and assigning weighing factors to pixels representing the one or more identified objects based on the morphological operations;
    - declaring the target as empty or non-empty based on the first predetermined criterion; and
    - assigning a confidence factor based at least on the weighting factors to the pixels representing the one or more identified objects.

25. A system for imaging a target comprising:
- a radiation source configured to direct radiation at the target;
- a detector configured to detect at least a portion of the radiation from the radiation source that passes through the target;
- a computer readable medium on which is encoded program code, the program code comprising:
- program code for generating an image of the target, the image including a plurality of pixels arranged in rows and columns, each of the plurality of pixels is assigned a brightness intensity based on the detecting; and
- program code for processing the target image based on the brightness intensity of each of the plurality of pixels to declare the target as empty or non-empty in accordance with a first predetermined criterion, including:
  - program code for identifying a region of the target in the target image;
  - program code for determining an interior of the target from the identified target region, including:
    - program code for identifying a first wall and a second wall of the target;
    - program code for identifying a floor of the target;
    - program code for identifying a ceiling of the target including:
      - program code for performing a Fast Fourier Transformation (FFT) of the brightness intensity of each pixel row in the target region;
      - program code for identifying a dominant frequency from the FFT of a predetermined number of upper rows in the target region;
      - program code for identifying a disappearance of dominant frequency from one of the predetermined upper rows to another one of the predetermined upper rows; and
      - program code for selecting the one of the predetermined upper rows as the target ceiling.

26. A system for imaging a target comprising:
- a radiation source configured to direct radiation at the target;
- a detector configured to detect at least a portion of the radiation from the radiation source that passes through the target;
- a computer readable medium on which is encoded program code, the program code comprising:
- program code for generating an image of the target, the image including a plurality of pixels arranged in rows and columns, each of the plurality of pixels is assigned a brightness intensity based on the detecting; and
- program code for processing the target image based on the brightness intensity of each of the plurality of pixels to declare the target as empty or non-empty in accordance with a first predetermined criterion, including:
  - program code for identifying a region of the target in the target image;
  - program code for determining an interior of the target from the identified target region, including:
    - program code for identifying a first wall and a second wall of the target;
    - program code for identifying a floor of the target;
    - program code for identifying a ceiling of the target, including:
      - program code for determining vertical and diagonal edge pixels in the container region;
      - program code for calculating a mean edge density function for all pixel rows in the container region based on the determined vertical and diagonal edges;
      - program code for fitting a best ramp function to the mean edge density function; and
      - program code for identifying the target ceiling from the best ramp function.

27. A system for imaging a target comprising:
- a radiation source configured to direct radiation at the target;
- a detector configured to detect at least a portion of the radiation from the radiation source that passes through the target;
- a computer readable medium on which is encoded program code, the program code comprising:
- program code for generating an image of the target, the image including a plurality of pixels arranged in rows and columns, each of the plurality of pixels is assigned a brightness intensity based on the detecting; and program code for processing the target image based on the brightness intensity of each of the plurality of pixels to declare the target as empty or non-empty in accordance with a first predetermined criterion, including:
  program code for identifying a region of the target in the target image;
  program code for determining an interior of the target from the identified target region, including:
    program code for performing a first segmentation of the target interior into empty and non-empty regions; and
    program code for reporting any problems with the processing of the target image, including:
    program code for determining whether the non-empty region exceeds a predetermined threshold percentage of the target; and
    program code for upon the non-empty region exceeding the predetermined threshold percentage, classifying the target as non-empty
  upon the non-empty region not exceeding the predetermined threshold percentage, program code for additionally processing the target image to evaluate the non-empty region, including:
    program code for removing any vertical patterns from the empty region of the target interior;
    program code for re-determining the target interior based at least on the removing the vertical patterns from the empty region of the target interior; and
    program code for performing a second segmentation of the target interior into new empty and new non-empty regions based on the re-determining the target interior
  program code for performing morphological operations to the new non-empty region;
  program code for identifying one or more objects in the non-empty region and assigning weighing factors to pixels representing the one or more identified objects based on the morphological operations;
  program code for declaring the target as empty or non-empty based on the first predetermined criterion; and
  program code for assigning a confidence factor based at least on the weighting factors to the pixels representing the one or more identified objects.

* * * * *